(12) United States Patent
Kitagawa

(10) Patent No.: US 8,395,680 B2
(45) Date of Patent: Mar. 12, 2013

(54) ADAPTER APPARATUS CONNECTED TO AN IMAGE CAPTURING APPARATUS AND DELIVERING VIDEO FILES THEREOF TO A CLIENT APPARATUS, CONTROL METHOD THEREOF, AND COMPUTER PROGRAM

(75) Inventor: Eiichiro Kitagawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 609 days.

(21) Appl. No.: 12/186,970

(22) Filed: Aug. 6, 2008

(65) Prior Publication Data

US 2009/0046992 A1 Feb. 19, 2009

(30) Foreign Application Priority Data

Aug. 15, 2007 (JP) ................... 2007-211930

(51) Int. Cl.
*H04N 5/76* (2006.01)
(52) U.S. Cl. .................................... 348/231.2
(58) Field of Classification Search .................. None
See application file for complete search history.

(56) References Cited

U.S. PATENT DOCUMENTS

| 7,212,731 | B1 * | 5/2007 | Morotomi et al. | 386/241 |
| 2004/0003053 | A1 * | 1/2004 | Williams | 709/217 |
| 2006/0034533 | A1 * | 2/2006 | Batchvarov | 382/245 |
| 2006/0092771 | A1 * | 5/2006 | Loui et al. | 369/30.01 |
| 2007/0206101 | A1 * | 9/2007 | Ueno et al. | 348/211.99 |

FOREIGN PATENT DOCUMENTS

| JP | 11-088865 A | 3/1999 |
| JP | 2005-033357 | 2/2005 |
| JP | 2005-333557 A | 12/2005 |
| JP | 2006-099840 | 4/2006 |
| JP | 2007-013879 A | 1/2007 |
| JP | 2007-159137 A | 6/2007 |

OTHER PUBLICATIONS

The above references were cited in a Aug. 10, 2012 Japanese Office Action, which is enclosed without English Translation, that issued in Japanese Patent Application No. 2007-211930.

\* cited by examiner

*Primary Examiner* — Albert Cutler
(74) *Attorney, Agent, or Firm* — Cowan, Liebowitz & Latman, P.C.

(57) ABSTRACT

Video files recorded on a disk recording medium are acquired from an image capturing apparatus. First contents information indicating a list of the acquired video files is created. Based on the created first contents information, second contents information in a network advertisement format is created. Based on the first contents information and the acquired video files, video files in the network advertisement format are created. The created second contents information is advertised onto a network. Video files requested from a client terminal on the network based on the second contents information are delivered to the client terminal.

8 Claims, 27 Drawing Sheets

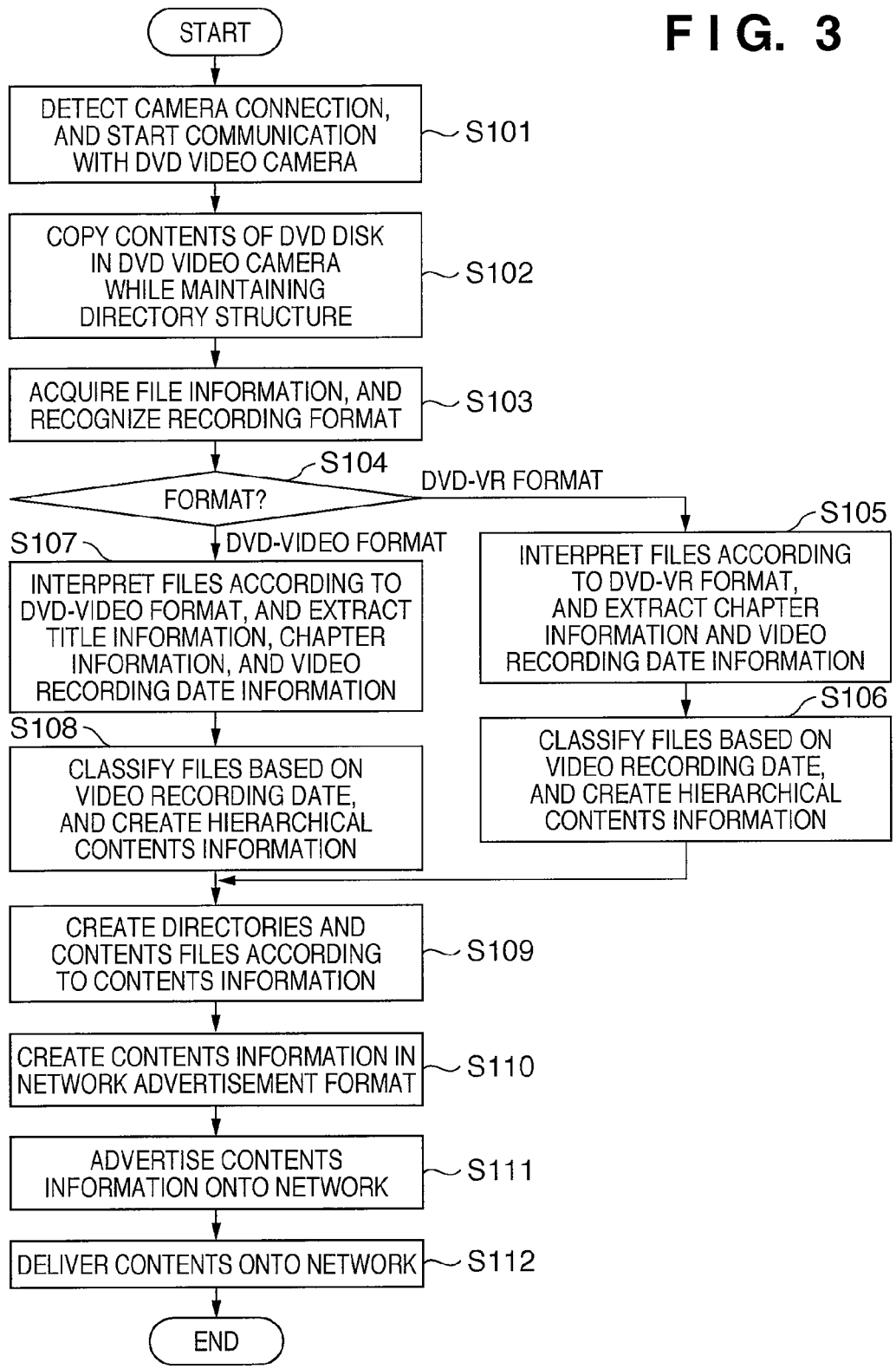

FIG. 8A

```
<?xml version="1.0"?>
<s:Envelope
 xmlns:s="http://schemas.xmlsoap.org/soap/envelope/"
 s:encodingStyle="http://schemas.xmlsoap.org/soap/encoding/">
 <s:Body>
  <u:BrowseResponse xmlns:u="urn:schemas-upnp-org:service:ContentDirectory:1">
   <Result><DIDL-Lite xmlns="urn:schemas-upnp-org:metadata-1-0/DIDL-Lite/"
 xmlns:upnp="urn:schemas-upnp-org:metadata-1-0/upnp/"
 xmlns:dc="http://purl.org/dc/elements/1.1/"
 xmlns:dlna="urn:schemas-dlna-org:metadata-1-0/">
   <container id="/20060501" parentID="0" restricted="1">
   <dc:title>MAY 1, 2006</dc:title>
   <upnp:class>object.container</upnp:class>
   </container>
   <container id="/20060502" parentID="0" restricted="1">
   <dc:title>MAY 2, 2006</dc:title>
   <upnp:class>object.container</upnp:class>
   </container>
   </DIDL-Lite>
   </Result>
   <NumberReturned>2</NumberReturned>
   <TotalMatches>2</TotalMatches>
   <UpdateID>0</UpdateID>
  </u:BrowseResponse>
 </s:Body>
</s:Envelope>
```

F I G. 8B

```xml
<?xml version="1.0"?>
<s:Envelope
xmlns:s="http://schemas.xmlsoap.org/soap/envelope/"
s:encodingStyle="http://schemas.xmlsoap.org/soap/encoding/">
<s:Body>
    <u:BrowseResponse xmlns:u="urn:schemas-upnp-org:service:ContentDirectory:1">
        <Result><DIDL-Lite xmlns:upnp="urn:schemas-upnp-org:metadata-1-0/upnp/"
xmlns:dc="http://purl.org/dc/elements/1.1/"
xmlns:dlna="urn:schemas-dlna-org:metadata-1-0/">
<item id="/20060501" Movie1.mpg.parentID="/20060501" restricted="1">
<res protocolInfo="http-get*.video/mpeg.DLNA.ORG.PN=MPEG_PS_NTSC">http://192.168.101.3:8000/20060501/Movie1.mpg</res>
<upnp:class>object.item.videoItem</upnp:class>
<dc:title>Movie1</dc:title>
</item>
<item id="/20060501/Movie2.mpg" parentID="/20060501" restricted="1">
<res protocolInfo="http-get*.video/mpeg.DLNA.ORG.PN=MPEG_PS_NTSC">http://192.168.101.3:8000/20060501/Movie2y.mpg</res>
<upnp:class>object.item.videoItem</upnp:class>
<dc:title>Movie2</dc:title>
</item>
<item id="/20060501/Movie3.mpg" parentID="/20060501" restricted="1">
<res protocolInfo="http-get*.video/mpegDLNA.ORG.PN=MPEG_PS_NTSC">http://192.168.101.3:8000/20060501/Movie3.mpg</res>
<upnp:class>object.item.videoItem</upnp:class>
<dc:title>Movie3</dc:title>
</item>
</DIDL-Lite>
</Result>
<NumberReturned>3</NumberReturned>
<TotalMatches>3</TotalMatches>
<UpdateID>0</UpdateID>
    </u:BrowseResponse>
</s:Body>
</s:Envelope>
```

FIG. 8C

```
<?xml version="1.0"?>
<s:Envelope
xmlns:s="http://schemas.xmlsoap.org/soap/envelope/"
s:encodingStyle="http://schemas.xmlsoap.org/soap/encoding/">
<s:Body>
<u:BrowseResponse xmlns:u="urn:schemas-upnp-org:service:ContentDirectory:1">
<Result><DIDL-Lite xmlns="urn:schemas-upnp-org:metadata-1-0/DIDL-Lite/"
xmlns:upnp="urn:schemas-upnp-org:metadata-1-0/upnp/"
xmlns:dc="http://purl.org/dc/elements/1.1/"
xmlns:dlna="urn:schemas-dlna-org:metadata-1-0/">
<item id="/20050502/Movie4.mpg" parentID="/20060502" restricted="1">
<res protocolInfo="http-get*.video/mpeg:DLNA_ORG_PN=MPEG_PS_NTSC">http://192.168.101.3:8000/20060502/Movie1.mpg</res>
<upnp:class>object.item.videoItem</upnp:class>
<dc:title>Movie1</dc:title>
</item>
<item id="/20060502/Movie5.mpg" parentID="/20060502" restricted="1">
<res protocolInfo="http-get*.video/mpeg:DLNA_ORG_PN=MPEG_PS_NTSC">http://192.168.101.3:8000/20060502/Movie2.mpg</res>
<upnp:class>object.item.videoItem</upnp:class>
<dc:title>Movie2</dc:title>
</item>
</DIDL-Lite>
</Result>
<NumberReturned>2</NumberReturned>
<TotalMatches>2</TotalMatches>
<UpdateID>0</UpdateID>
</u:BrowseResponse>
</s:Body>
</s:Envelope>
```

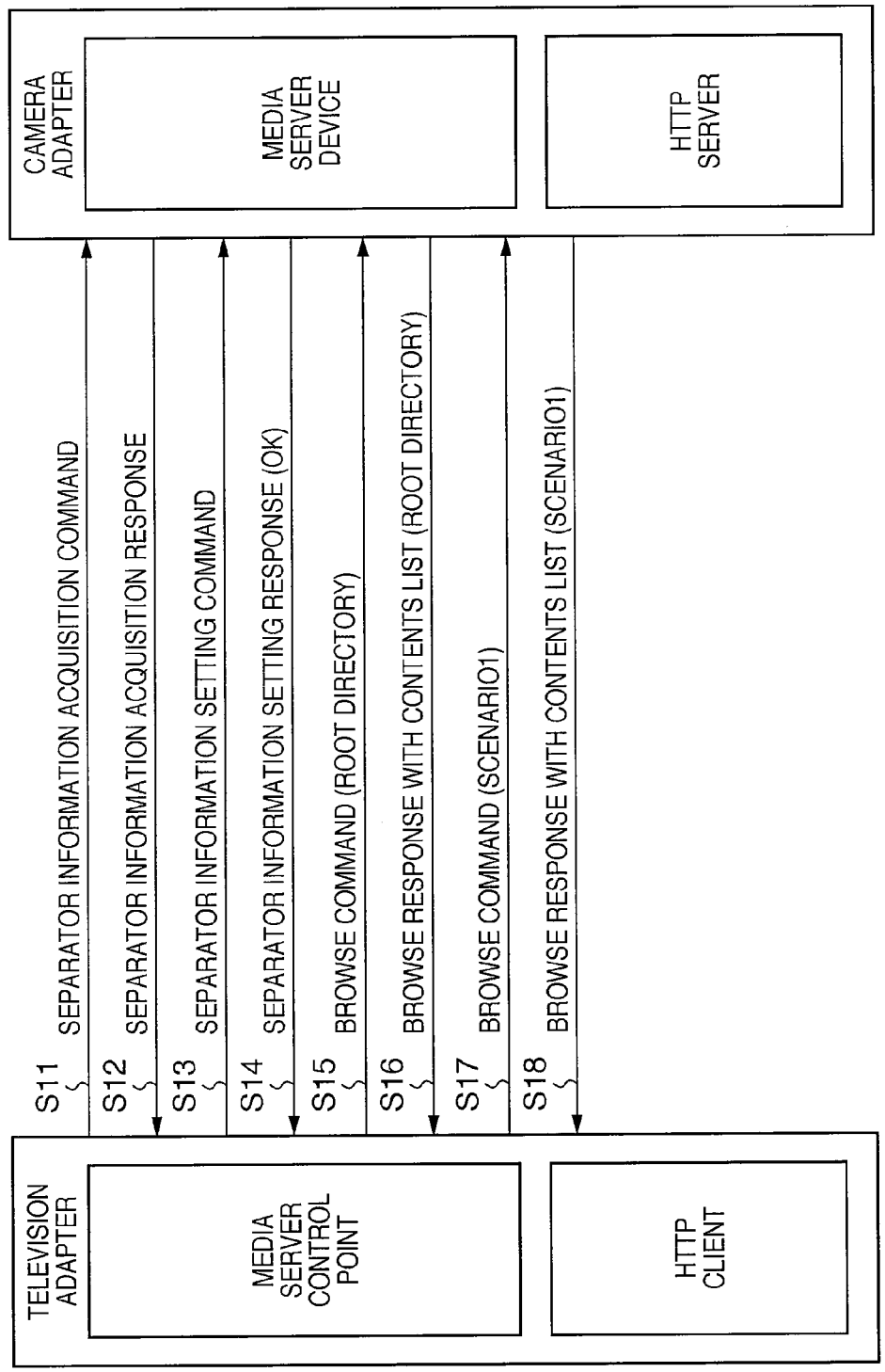

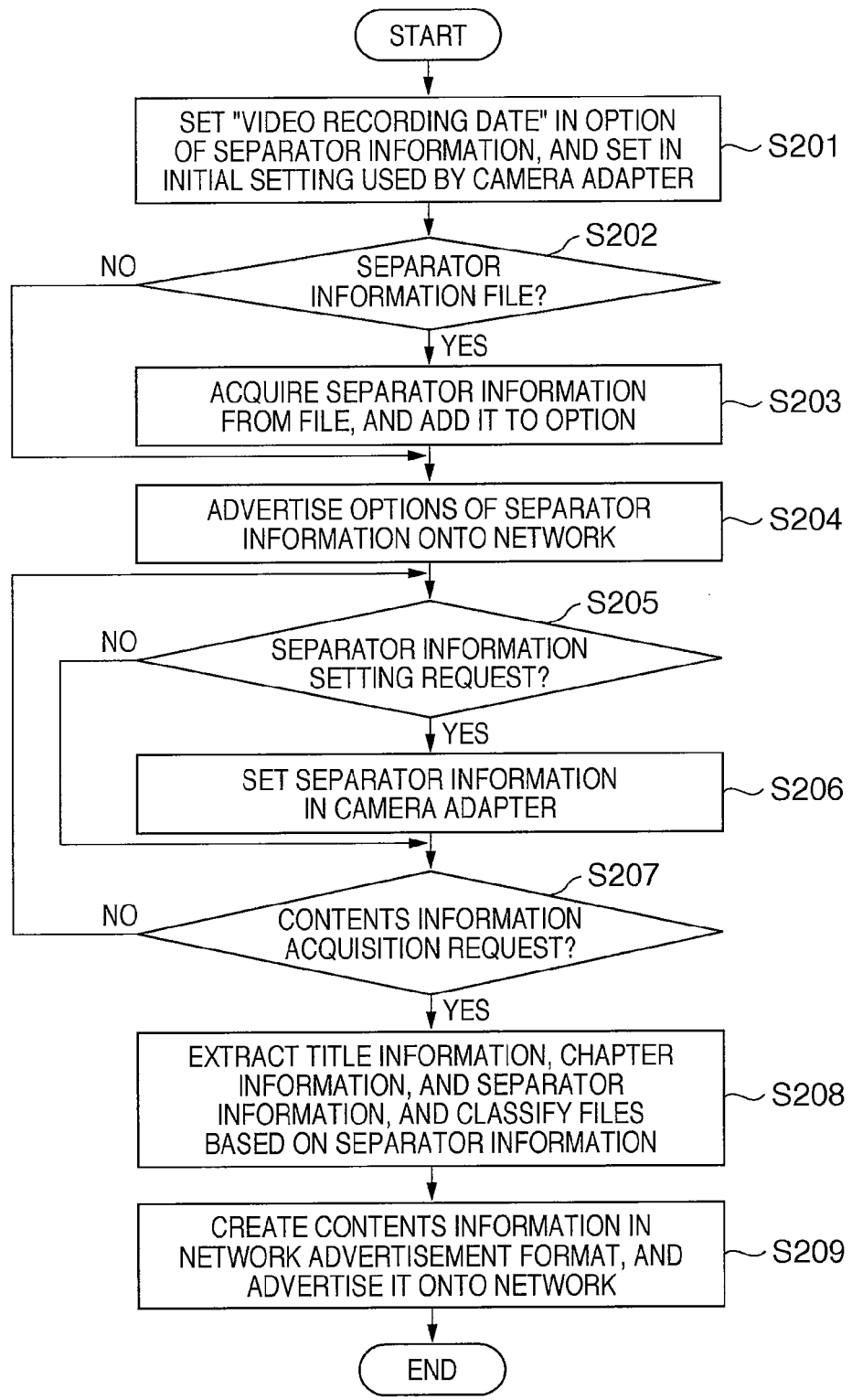

FIG. 13

```
<SeparatorList>
<Separator information = Power>
</SeparatorList>

<event information=Power   attrib=on      date=2006_05_03  time=13:00:00>
<event information=Rec     attrib=start   date=2006_05_03  time=13:05:00>
<event information=Rec     attrib=stop    date=2006_05_03  time=13:05:20>
<event information=Rec     attrib=start   date=2006_05_03  time=13:08:03>
<event information=Rec     attrib=stop    date=2006_05_03  time=13:08:40>
<event information=Rec     attrib=start   date=2006_05_03  time=13:10:30>
<event information=Rec     attrib=stop    date=2006_05_03  time=13:11:42>
<event information=Power   attrib=off     date=2006_05_03  time=13:13:50>

<event information=Power   attrib=on      date=2006_05_05  time=10:30:15>
<event information=Rec     attrib=start   date=2006_05_05  time=10:35:10>
<event information=Rec     attrib=stop    date=2006_05_05  time=10:35:55>
<event information=Rec     attrib=start   date=2006_05_05  time=10:36:20>
<event information=Rec     attrib=stop    date=2006_05_05  time=10:37:10>
<event information=Rec     attrib=start   date=2006_05_05  time=10:38:30>
<event information=Rec     attrib=stop    date=2006_05_05  time=10:39:20>
<event information=Power   attrib=off     date=2006_05_05  time=10:40:50>

<event information=Power   attrib=on      date=2006_05_05  time=13:00:30>
<event information=Rec     attrib=start   date=2006_05_05  time=13:03:10>
<event information=Rec     attrib=stop    date=2006_05_05  time=13:03:40>
<event information=Rec     attrib=start   date=2006_05_05  time=13:04:05>
<event information=Rec     attrib=stop    date=2006_05_05  time=13:04:55>
<event information=Rec     attrib=start   date=2006_05_05  time=13:10:00>
<event information=Rec     attrib=stop    date=2006_05_05  time=13:15:05>
<event information=Power   attrib=start   date=2006_05_05  time=13:18:03>
<event information=Power   attrib=stop    date=2006_05_05  time=13:20:50>
<event information=Power   attrib=off     date=2006_05_05  time=13:21:10>
```

FIG. 14A

| | CHAPTER (CAPTURED SCENE) | VIDEO RECORDING DATE | POWER ON/OFF INFORMATION |
|---|---|---|---|
| ROOT TITLE — | CHAPTER 1 | (MAY 3) | ON |
| | CHAPTER 2 | (MAY 3) | |
| | CHAPTER 3 | (MAY 3) | OFF |
| | CHAPTER 4 | (MAY 5) | ON |
| | CHAPTER 5 | (MAY 5) | OFF |
| | CHAPTER 6 | (MAY 5) | ON |
| | CHAPTER 7 | (MAY 5) | |
| | CHAPTER 8 | (MAY 5) | |
| | CHAPTER 9 | (MAY 5) | |
| | CHAPTER 10 | (MAY 5) | OFF |

F I G. 17
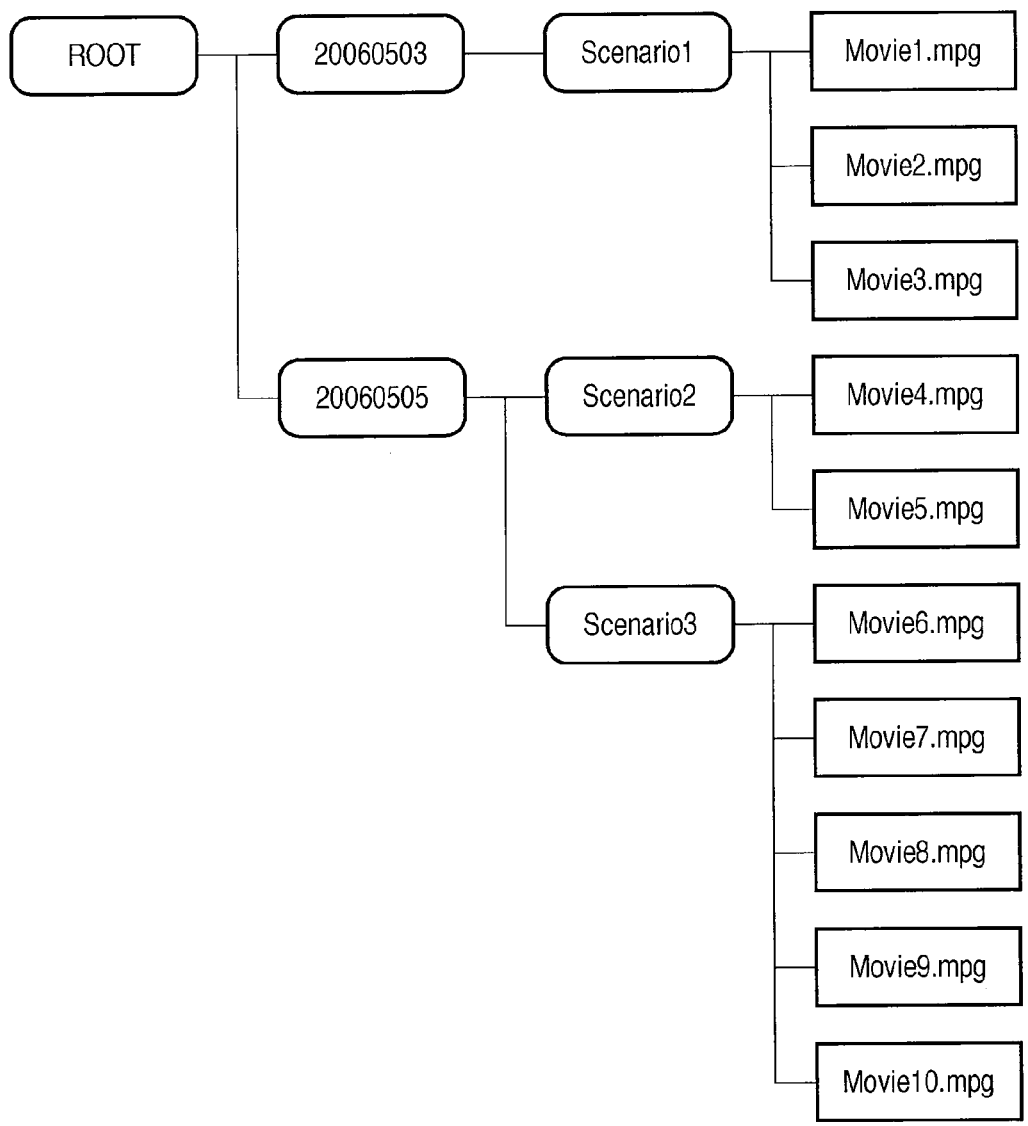

FIG. 19

| | CHAPTER (CAPTURED SCENE) | VIDEO RECORDING DATE | Trigger |
|---|---|---|---|
| ROOT TITLE | CHAPTER 1 | MAY 4 | ON |
| | CHAPTER 2 | MAY 4 | |
| | CHAPTER 3 | MAY 4 | |
| | CHAPTER 4 | MAY 5 | |
| | CHAPTER 5 | MAY 5 | |
| | CHAPTER 6 | MAY 5 | ON |
| | CHAPTER 7 | MAY 5 | |
| | CHAPTER 8 | MAY 5 | |
| | CHAPTER 9 | MAY 5 | |
| | CHAPTER 10 | MAY 5 | |

F I G. 20
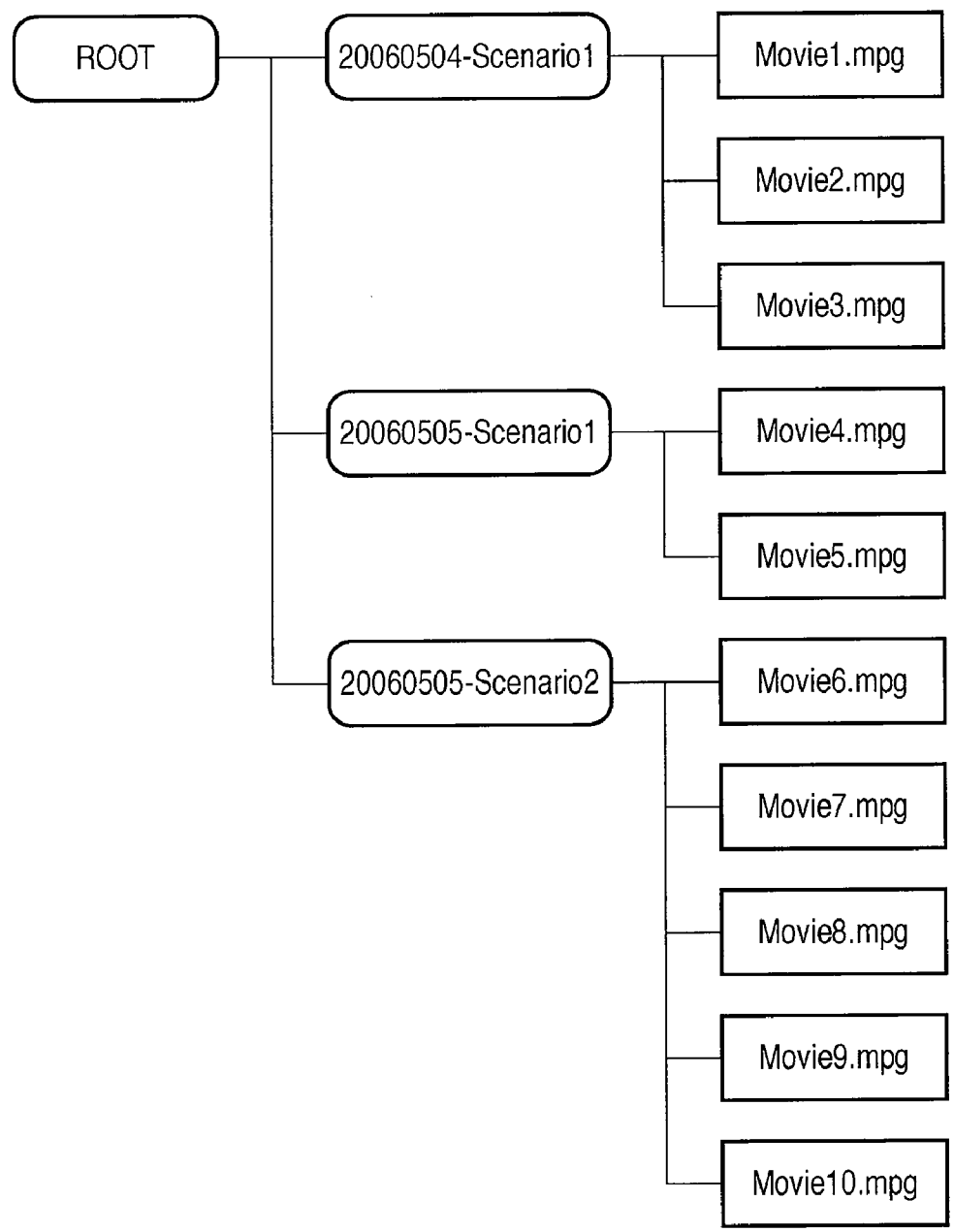

ADAPTER APPARATUS CONNECTED TO AN IMAGE CAPTURING APPARATUS AND DELIVERING VIDEO FILES THEREOF TO A CLIENT APPARATUS, CONTROL METHOD THEREOF, AND COMPUTER PROGRAM

BACKGROUND OF THE INVENTION

1. Field of the Invention

The present invention relates to an adapter apparatus which distributes a video file recorded on a disk recording medium of an image capturing apparatus to a client terminal on a network, a control method thereof, and a computer program.

2. Description of the Related Art

In recent years, a DVD video camera, which uses an optical disk such as a DVD or the like as a recording medium, and records captured video data on the optical disk, has appeared. In this DVD video camera, the optical disk that records the captured video data is unloaded, and is set in a general-purpose DVD player, thus allowing the user to enjoy the captured video data on a television as easily as he or she watches a commercially available DVD.

As optical disks used as the recording medium in the DVD video camera, an additionally recordable DVD-R disk and a rewritable DVD-RW disk or DVD-RAM disk are prevalently used. There are two different application formats upon recording on the recording medium. One format is a DVD-Video format which has high playback compatibility to a general-purpose DVD player, and the other format is a DVD-VR (Video Recording) format which has slightly lower playback compatibility but allows the user to easily make various edit processes.

As a technique for format-converting and recording the optical disk recorded by such DVD video camera to another medium, a technique for automatically recognizing the format type of a medium, and converting a video file created in the DVD format into an MPEG2 file is known (for example, see Japanese Patent Laid-Open No. 2006-099840).

Also, a technique for allowing the user to appreciate the configuration of an optical disk to be created more easily by grouping captured video data upon recording the video data on the optical disk by the DVD video camera is known (for example, see Japanese Patent Laid-Open No. 2005-333557).

On the other hand, home networking has prevailed, and network-compatible AV equipments which are connected to a home LAN and are used in cooperation with each other have appeared. As a technical standard for connecting home AV equipments and a personal computer to each other and operating them in cooperation with each other, a DLNA guideline has been formulated. When both a file server and video player are compliant with this guideline, the user can appreciate video contents stored in the file server using a player in a remote room via a network.

However, when a file created by the DVD video camera is merely converted into an MPEG2 file and the converted file is recorded on an optical disk, logical information such as titles, chapters, and the like, which are hierarchically configured on an optical disk is lost.

A method of automatically or semiautomatically giving hierarchical information upon recording captured video data on an optical disk by the DVD video camera may complicate the functions of the camera. In addition, operations upon video recording are hard to understand for the user or are troublesome, and the user hardly applies himself or herself to video recording.

Furthermore, since a recordable time of a DVD disk having a size of 8 cm used in the DVD video camera is at most several ten minutes, captured video data is recorded on a plurality of disks in case of long-term video recording of, for example, a concert or the like. For this reason, in a method of appreciating captured video data by playing back optical disks using a DVD player, the user needs to exchange optical disks many times during appreciation.

Also, there is no simple method that allows the user to play back video data captured by the DVD video camera via a network and to watch the video from a free place at user's own convenience in home. In another method, after data is temporarily fetched by a PC, the user may convert and edit data using an application on the PC, and may copy a resultant file to a network-compatible hard disk. However, operations in this case are very complicated and time-consuming.

SUMMARY OF THE INVENTION

The present invention has been made to solve the aforementioned problems, and has as its object to provide an adapter apparatus which can accessibly distribute video data captured by a DVD video camera to a client terminal on a network, a control method thereof, and a computer program.

According to the first aspect of the present invention, an adapter apparatus, which connects an image capturing apparatus, comprises a disk recording unit for recording video data on a disk recording medium according to a specific format, and delivers video files recorded on the disk recording medium of the image capturing apparatus to a client terminal on a network, the apparatus comprising:

acquisition unit to configured to acquire video files recorded on the disk recording medium from the image capturing apparatus;

first creation unit to configured to create first contents information indicating a list of the video files acquired by the acquisition unit;

second creation unit to configured to create second contents information in a network advertisement format based on the first contents information created by the first creation unit;

video file creation unit to configured to create video files in the network advertisement format based on the first contents information created by the first creation unit and the video files acquired by the acquisition unit;

advertisement unit to configured to advertise the second contents information created by the second creation unit onto the network; and distribution unit to configured to distribute, to the client terminal, video files requested from the client terminal on the network based on the second contents information advertised by the advertisement unit.

In a preferred embodiment, the apparatus further comprises:

recognition unit to configured to recognize a recording format of the video files recorded on the disk recording medium; and interpretation unit to configured to interpret the video files acquired from the image capturing apparatus in accordance with the recording format recognized by the recognition unit, wherein the first creation unit creates the first contents information indicating the list of the video files acquired by the acquisition unit based on an interpretation result of the interpretation unit.

In a preferred embodiment, the recording format is one of a DVD-Video format and a DVD-VR format.

In a preferred embodiment, the first creation unit creates the first contents information indicating, as the list, a list obtained by classifying the video files acquired by the acquisition unit based on set separator information.

In a preferred embodiment, the first creation unit creates the first contents information indicating, as the list, a list obtained by classifying a plurality of captured scenes included in the video files acquired by the acquisition unit based on set separator information.

In a preferred embodiment, the first creation unit creates the first contents information indicating, as the list, a list obtained by classifying a plurality of captured scenes included in a plurality of video files acquired by the acquisition unit based on set separator information.

In a preferred embodiment, the apparatus further comprises setting unit to configured to set the separator information.

In a preferred embodiment, the apparatus further comprises:

storage unit to configured to store a plurality of types of separator information; and selection unit to configured to select the separator information used by the first creation unit from the plurality of types of separator information.

According to the second aspect of the present invention, a method of controlling an adapter apparatus, which connects an image capturing apparatus comprising a disk recording unit for recording video data on a disk recording medium according to a specific format, and delivers video files recorded on the disk recording medium of the image capturing apparatus to a client terminal on a network, the method comprises:

an acquisition step of acquiring video files recorded on the disk recording medium from the image capturing apparatus;

a first creation step of creating first contents information indicating a list of the video files acquired in the acquisition step;

a second creation step of creating second contents information in a network advertisement format based on the first contents information created in the first creation step;

a video file creation step of creating video files in the network advertisement format based on the first contents information created in the first creation step and the video files acquired in the acquisition step;

an advertisement step of advertising the second contents information created in the second creation step onto the network; and a distribution step of distributing, to the client terminal, video files requested from the client terminal on the network based on the second contents information advertised in the advertisement step.

According to the third aspect of the present invention, a computer program stored in a computer storage medium to make a computer execute control of an adapter apparatus, which connects an image capturing apparatus comprising a disk recording unit for recording video data on a disk recording medium according to a specific format, and delivers video files recorded on the disk recording medium of the image capturing apparatus to a client terminal on a network, the program making the computer execute:

an acquisition step of acquiring video files recorded on the disk recording medium from the image capturing apparatus;

a first creation step of creating first contents information indicating a list of the video files acquired in the acquisition step;

a second creation step of creating second contents information in a network advertisement format based on the first contents information created in the first creation step;

a video file creation step of creating video files in the network advertisement format based on the first contents information created in the first creation step and the video files acquired in the acquisition step;

an advertisement step of advertising the second contents information created in the second creation step onto the network; and a distribution step of distributing, to the client terminal, video files requested from the client terminal on the network based on the second contents information advertised in the advertisement step.

Further features of the present invention will become apparent from the following description of exemplary embodiments with reference to the attached drawings.

BRIEF DESCRIPTION OF THE DRAWINGS

FIG. 3 is a flowchart showing processing of the camera adapter executed when a DVD video camera is connected to the camera adapter according to the first embodiment of the present invention;

FIG. 8A is a view showing contents information for network advertisement, which is generated by the camera adapter according to the first embodiment of the present invention;

FIG. 8B is a view showing contents information for network advertisement, which is generated by the camera adapter according to the first embodiment of the present invention;

FIG. 8C is a view showing contents information for network advertisement, which is generated by the camera adapter according to the first embodiment of the present invention;

FIG. 10 is a chart showing a communication sequence associated with acquisition of separator information, a contents list, and contents between the television adapter and camera adapter according to the second embodiment of the present invention;

FIG. 12 is a flowchart showing processing of the camera adapter according to the second embodiment of the present invention;

FIG. 13 is a view showing an example of a separator information file according to the second embodiment of the present invention;

FIG. 14A is a view showing an example of the logical configuration of captured scenes according to the second embodiment of the present invention;

FIG. 17 is a view showing an example of contents information of the directory and file configurations according to the third embodiment of the present invention;

FIG. 19 is a view showing an example of the logical configuration of captured scenes according to the third embodiment of the present invention;

FIG. 20 is a view showing an example of contents information of the directory and file configurations according to the third embodiment of the present invention;

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
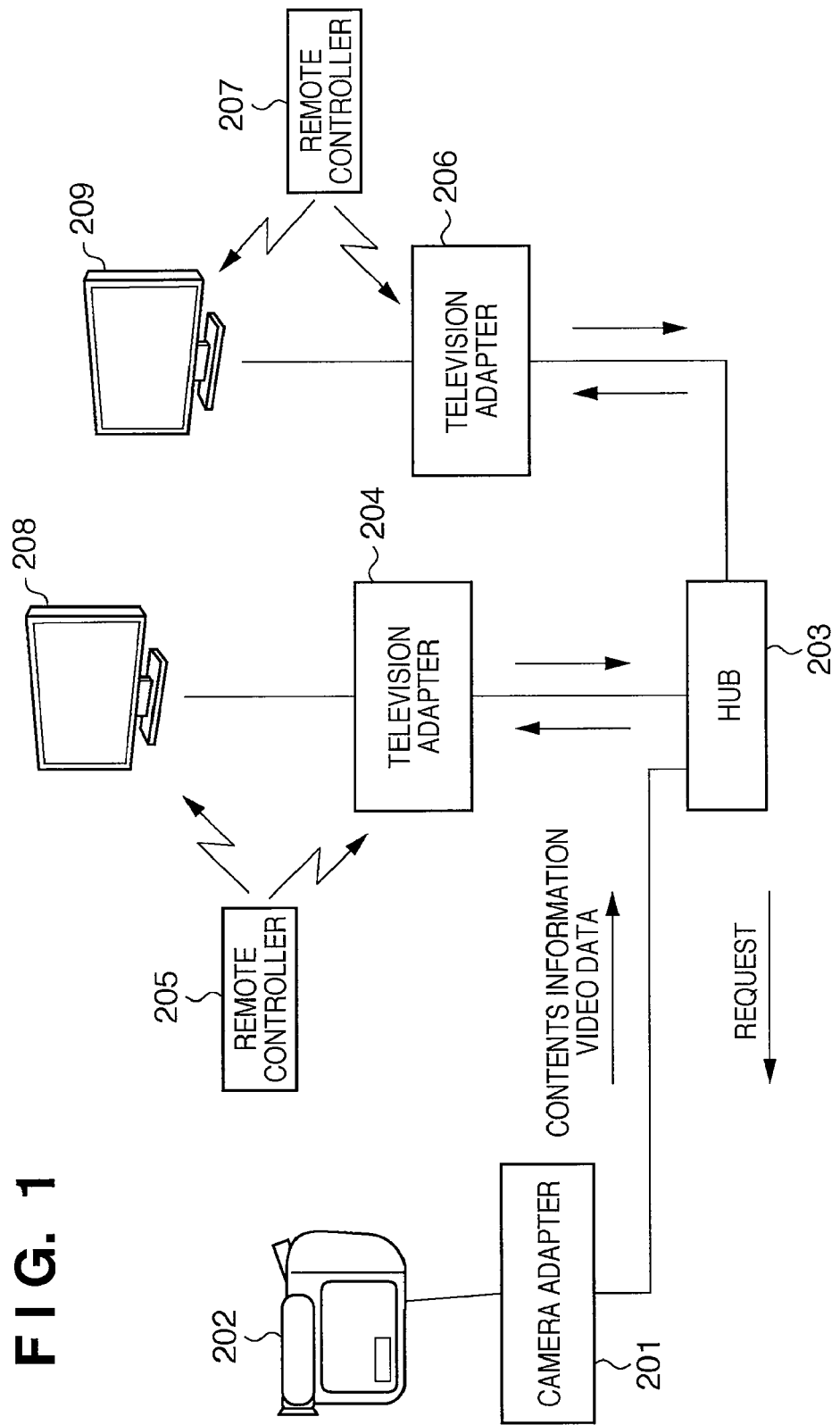
FIG. 1 is a diagram showing the system arrangement in a case in which a camera adapter according to the first embodiment of the present invention is connected to a home network when it is used.

FIG. 1 is a diagram showing the system arrangement in a case in which a camera adapter according to the first embodiment of the present invention is connected to a home network when it is used.

A camera adapter 201 and television adapters 204 and 206 are connected to a network via a HUB 203.

The camera adapter 201 is connected to a DVD video camera 202 as an image capturing apparatus via a USB interface. The camera adapter 201 acquires video files and their related information files recorded on a DVD disk (a disk recording medium such as a DVD-R, DVD-RW, or the like) in the DVD video camera 202 from the DVD video camera 202. The camera adapter 201 accepts requests in a format compliant with the DLNA guideline from the television adapters 204 and 206, and transmits contents information and a video data stream.

The television adapters 204 and 206 are general digital media players, which operate in conformity to the DLNA guideline. The television adapters 204 and 206 have video and audio output terminals, and are respectively connected to televisions 208 and 209 via video and audio cables. The television adapters 204 and 206 support the MPEG2-PS format as the moving image format. The television adapters 204 and 206 play back an MPEG2 file and can display the played-back video and audio on the televisions 208 and 209.

User operations with respect to the televisions 208 and 209 are attained by remote controllers 205 and 207, and menus for user operations can be displayed on the screens of the televisions 208 and 209 (television screens). A user gives the instruction to display contents information (video file information) or contents (video files) received from the camera adapter 201 by operating the remote controller 205 or 207 while viewing a GUI window displayed on the television screen.

A protocol used for device discovery and contents list display between the camera adapter 201 and television adapters 204 and 206 uses the UPnP (Universal Plug and Play) standard in conformity to the DLNA guideline.

Note that the contents list is information (contents information) indicating a list of video files classified based on designated separator information (classification information).

The DVD video camera 202 connected to the camera adapter 201 of the present invention will be briefly described below. In the first embodiment, for example, a rewritable DVD-RW disk (to be simply referred to as a DVD disk hereinafter) is used as a recording medium of the DVD video camera 202.

Both the DVD-Video format and DVD-VR format are used as the recording format (application file format). When a DVD disk is set in the DVD video camera 202 for the first time, the user selects one of these formats to be used, thus formatting the DVD disk. The formatted DVD disk can be used in video recording by the DVD video camera 202.

In this way, the DVD video camera 202 records a video on the DVD disk via a disk recording unit (not shown) according to the specific format.

Before the DVD video camera 202 is connected to the camera adapter 201, it needs to execute end processing called finalization for the DVD disk that has recorded the captured video data. From the finalized DVD disk, another apparatus can read out the recorded video data as video files.

Upon recording data on a DVD disk in the DVD-VR format, captured video data can be additionally recorded even after finalization. On the other hand, upon recording data on a DVD disk in the DVD-Video format, additional recording of captured video data on the finalized disk is not allowed. However, when the DVD video camera 202 applies processing called unfinalization to the DVD disk, additional recording of captured video data is allowed. In this case, the disk is finalized again before the DVD video camera 202 is connected to the camera adapter 201.

The aforementioned contents associated with the DVD video camera 202 connected to the camera adapter 201 of the present invention are associated with a general DVD video camera.

The camera adapter 201 according to the first embodiment of the present invention will be described below with reference to FIG. 2.

Figure 2:
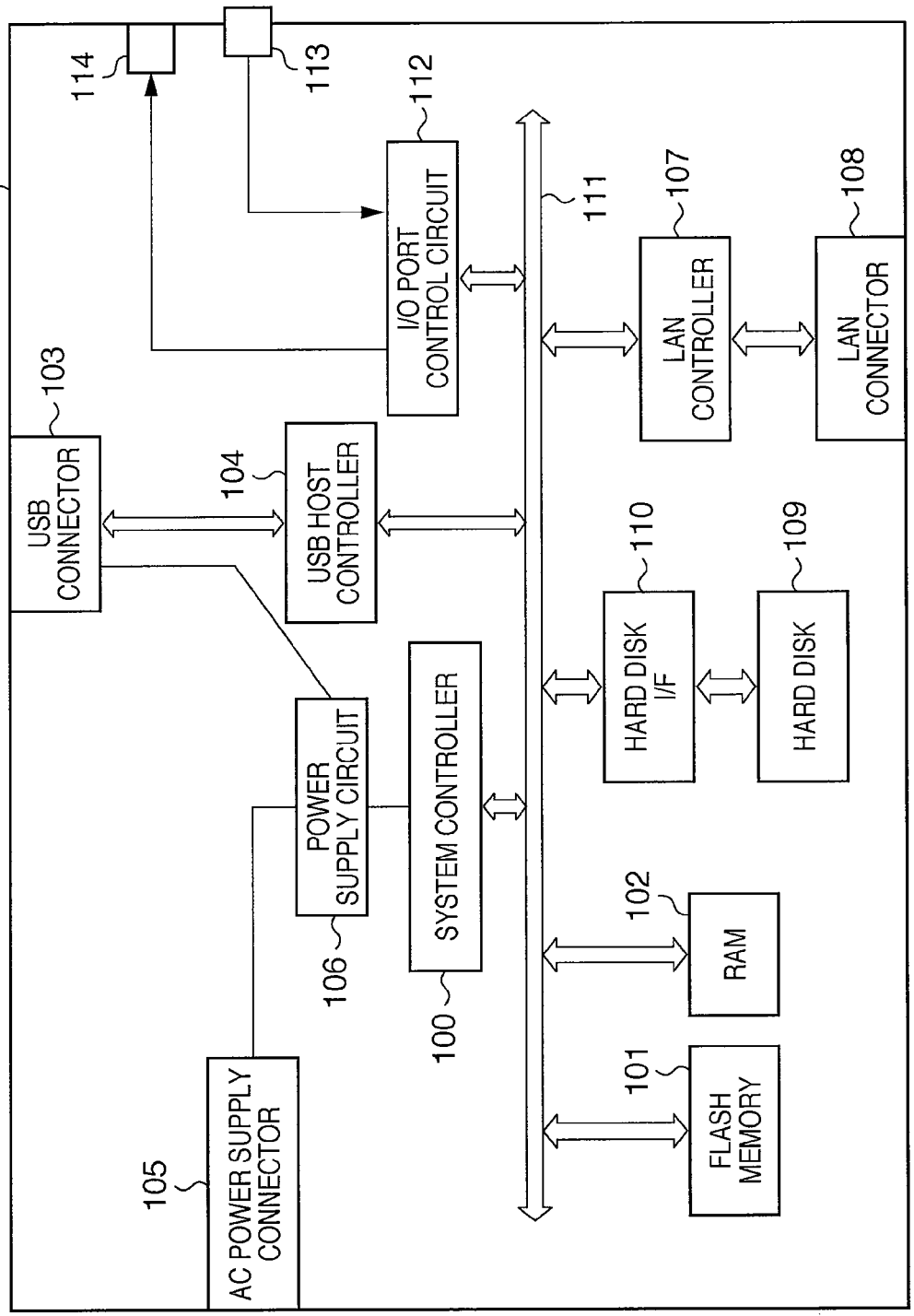
FIG. 2 is a block diagram showing the arrangement of the camera adapter according to the first embodiment of the present invention.

FIG. 2 is a block diagram showing the arrangement of the camera adapter according to the first embodiment of the present invention.

Reference numeral 100 denotes a system controller which controls the operations of the whole camera adapter 201. Reference numeral 101 denotes a flash memory which stores an operation program and setting values of the system controller 100. Reference numeral 102 denotes a RAM which stores temporary data. Reference numeral 103 denotes a USB connector used to connect the DVD video camera 202 via a USB cable. Reference numeral 104 denotes a USB host controller which controls the DVD video camera 202 and receives files from the DVD video camera 202 via communications with the DVD video camera 202.

Reference numeral 105 denotes an AC power supply connector. Reference numeral 106 denotes a power supply circuit which generates electric power to be supplied to various components of the camera adapter 201 as well as the system controller 100 by converting electric power from an AC power supply. Reference numeral 107 denotes a LAN controller used to communicate with a client terminal on the network. Reference numeral 108 denotes a LAN connector used to connect a network cable.

Note that the client terminal includes, for example, the television adapters 204 and 206. Of course, the client terminal includes apparatuses such as a storage server, personal computer, and the like connected on the network in addition to the television adapters 204 and 206.

Reference numeral 109 denotes a hard disk which stores data received from the DVD video camera 202 and those created by the camera adapter 201. Reference numeral 110 denotes a hard disk interface (I/F). Reference numeral 111 denotes a system bus of the system controller 100. Reference numeral 112 denotes an I/O port control circuit. Reference numeral 113 denotes a soft switch which is operated by the user as a button to send a disconnection permission of the DVD video camera 202 to the camera adapter 201. Reference numeral 114 denotes an LED which informs the user of the state of the camera adapter 201 by its indication. With this LED 114, blue lighting indicates a communication connection state with the DVD video camera 202, blue flickering indicates data transfer in progress with the DVD video camera 202, and red lighting indicates a communication disconnection state from the DVD video camera 202.

The processing of the camera adapter 201 when the DVD video camera 202 is connected to the camera adapter 201 will be described below with reference to FIG. 3.

FIG. 3 is a flowchart showing the processing of the camera adapter when the DVD video camera is connected to the camera adapter according to the first embodiment of the present invention.

Note that this processing is implemented when the system controller 100 of the camera adapter 201 controls various components in the camera adapter 201.

When the DVD video camera 202 is connected to the camera adapter 201 via USB, the USB host controller 104 detects a status change of a USB port and detects camera connection. The USB host controller 104 executes USB connection processing, and recognizes that the DVD video camera 202 can communicate with the camera adapter 201 in a USB mass storage class protocol. The USB host controller 104 starts a communication session of the USB mass storage class protocol, and mounts a DVD disk image on a file system mapped on the hard disk 109 of the DVD video camera 202. In this stage, the camera adapter 201 can read the contents of the DVD disk set in the DVD video camera 202 as files. In this manner, the camera adapter 201 detects camera connection and starts a communication with the DVD video camera 202 (step S101).

The camera adapter 201 temporarily copies all video files below the root directory on the DVD disk to a temporary area of the hard disk 109 while keeping its directory configuration (step S102). Since all subsequent processes are executed for the copy on the camera adapter 201, the DVD video camera 202 can be disconnected from the camera adapter 201 at any time.

The camera adapter 201 acquires file information (directory configuration information) of the root directory copied to the temporary area, and recognizes the recording format of the DVD disk (step S103).

Figure 4A:
FIG. 4A is a view showing an example of the directory configuration when the recording format of a DVD disk according to the first embodiment of the present invention is the DVD-VR format.

FIG. 4A shows an example of the directory configuration when the recording format of the DVD disk in the DVD video camera 202 is the DVD-VR format.

In the DVD-VR format, a DVD_RTAV directory exists under the root directory. A VR_MANGR.IFO file under the DVD_RTAV directory is a file including application information required to play back contents. A VR_MOVIE.VRO file is a file including actual video and audio contents.

When the DVD disk has the directory configuration shown in FIG. 4A, the camera adapter 201 recognizes that the recording format of the DVD disk is the DVD-VR format.

Figure 5A:
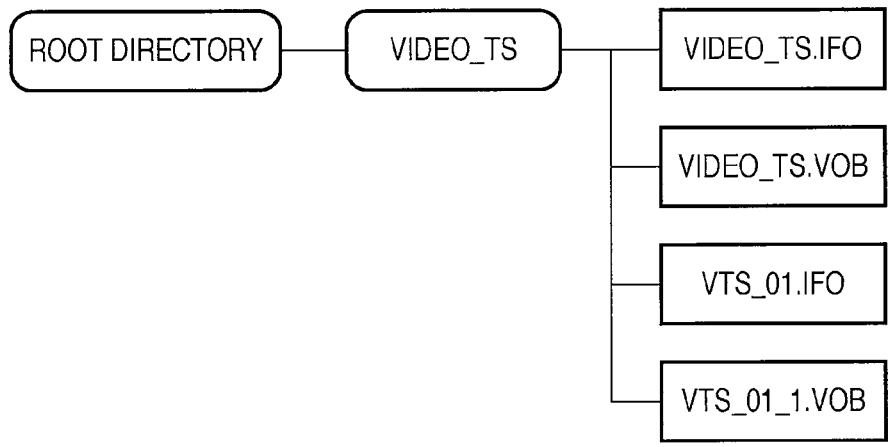
FIG. 5A is a view showing an example of the directory configuration when the recording format of a DVD disk according to the first embodiment of the present invention is the DVD-Video format.

On the other hand, FIG. 5A shows an example of the directory configuration when the recording format of the DVD disk in the DVD video camera 202 is the DVD-Video format.

In the DVD-Video format, a VIDEO_TS directory exists under the root directory. Files with an extension "VOB" are those which include actual video and audio contents. Files with an extension "IFO" are those which include application information required to play back contents. In addition, files with an extension "BUP" exist as backup files of those with the extension "IFO", but they are not shown in FIG. 5A.

Files with names starting with "VIDEO_TS" are those which represent information of the whole DVD disk. In this case, a VIDEO_TS.IFO file that stores information of the whole DVD disk, and a VIDEO_TS.VOB file that stores menu information of the whole DVD disk exist. Furthermore, a VTS_01_0.IFO file that stores information associated with actual captured scenes and a VTS_01_1.VOB file that stores captured video data exist.

When the DVD disk has the file configuration shown in FIG. 5A, the camera adapter 201 recognizes that the recording format is the DVD-Video format.

The description will revert to FIG. 3.

The camera adapter 201 branches processes depending on the recognized type of the recording format (step S104). In case of the DVD-VR format, the process advances to step S105. The camera adapter 201 interprets files on the DVD disk according to the DVD-VR format, and extracts chapter information and video recording date information based on the interpretation result (step S105). The camera adapter 201 creates a logical configuration of captured scenes based on the extracted information.

Figure 4B:
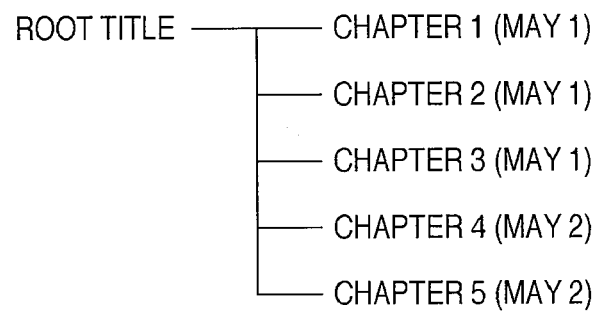
FIG. 4B is a view showing an example of the logical configuration of captured scenes according to the first embodiment of the present invention.

FIG. 4B shows an example of the logical configuration of captured scenes created based on the extracted information. In FIG. 4B, five captured scenes are created as chapters 1 to 5 under one root title. The video recording date of chapters 1 to 3 is May 1. The video recording date of chapters 4 and 5 is May 2.

The description will revert to FIG. 3.

Figure 4C:
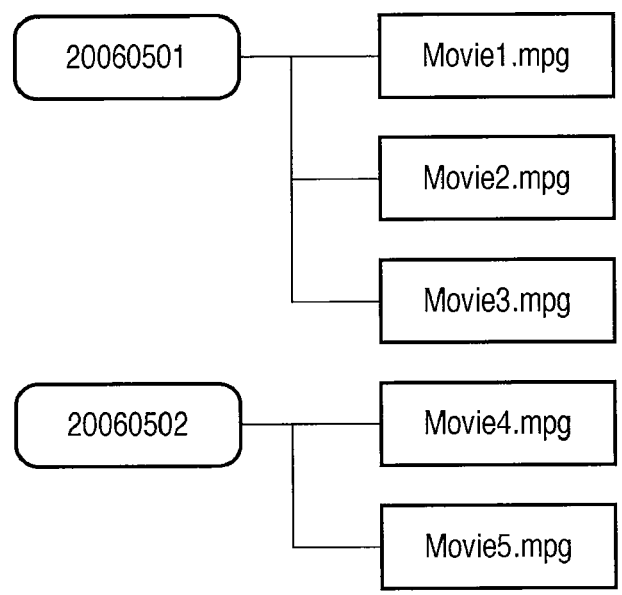
FIG. 4C is a view showing an example of contents information of the directory and file configurations according to the first embodiment of the present invention.

The camera adapter 201 creates hierarchical contents information (first contents information) having directory and file configurations shown in FIG. 4C using the video recording dates as separator information (step S106). That is, the camera adapter 201 has a function of a first creation unit that creates first contents information indicating a list of video files.

More specifically, the camera adapter 201 creates "20060501" and "20060502" folders corresponding to the respective video recording dates. Also, the camera adapter 201 creates Movie1.mpg to Movie3.mpg files under the "20060501" folder, and Movie4.mpg and Movie5.mpg files under the "20060502" folder.

A case will be explained below wherein the DVD video camera 202 is temporarily disconnected from the camera adapter 201, the DVD disk in the DVD video camera 202 is exchanged by another one, and the DVD video camera 202 is connected to the camera adapter 201 again.

Figure 4D:
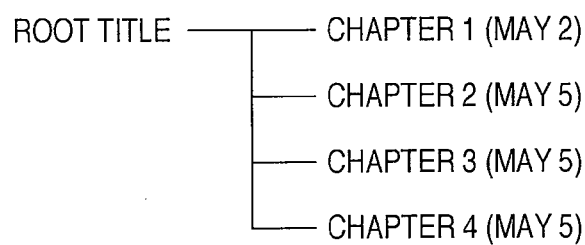
FIG. 4D is a view showing an example of the logical configuration of captured scenes according to the first embodiment of the present invention.

When the recording format of the added DVD disk is the DVD-VR format, that disk has the same file configuration as that in FIG. 4A. FIG. 4D shows an interpretation example of this disk according to the DVD-VR format.

A scene captured on May 2 after the first DVD disk is created in chapter 1, and three scenes captured on May 5 are respectively created in chapters 2 to 4.

Figure 4E:
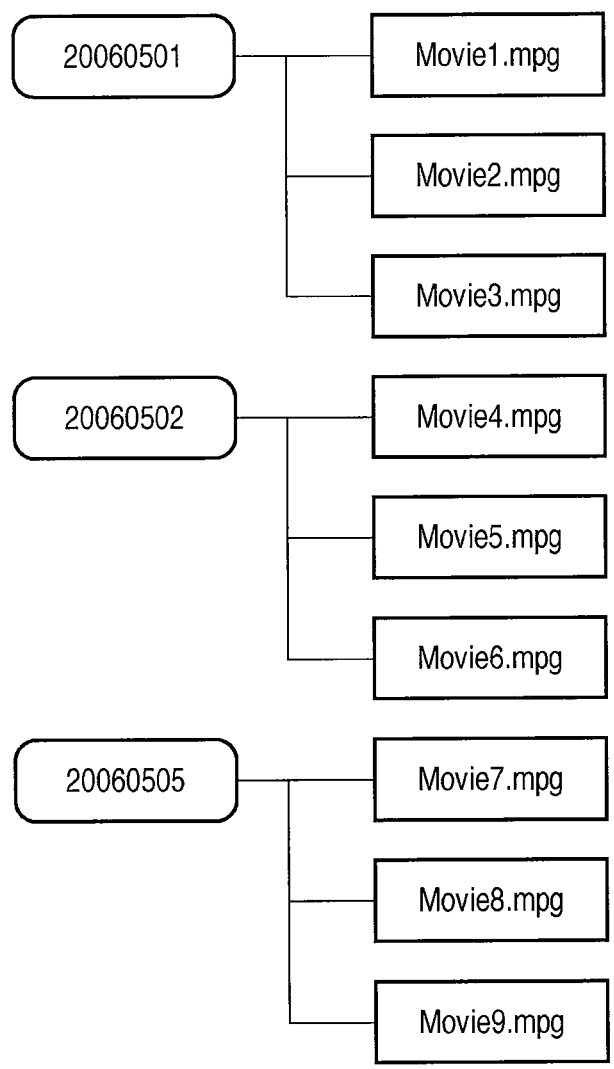
FIG. 4E is a view showing an example of contents information of the directory and file configurations according to the first embodiment of the present invention.

FIG. 4E shows an additional result of contents information based on the above information. Compared to FIG. 4C, a Movie6.mpg file is added under the "20060502" file. Also, a new "20060505" folder is created, and Movie7.mpg to Movie9.mpg files as three MPEG2 files are added.

As shown in this example, even when video recording is done using a plurality of DVD disks, if it is done at an identical video recording date, files are stored in a corresponding folder with a identical folder name. This is because the camera adapter 201 is set to classify captured scenes to have the video recording dates as separator information. Note that serial numbers are assigned to file names even when a plurality of DVD disks is used.

The description will revert to FIG. 3.

If the recording format of the DVD disk in the DVD video camera 202 is the DVD-Video format, the process advances to step S107. The camera adapter 201 interprets files on the DVD disk according to the DVD-Video format, and extracts title information, chapter information, and video recording date information. The camera adapter 201 creates a logical configuration of captured scenes based on the extracted information (step S107).

Figure 5B:
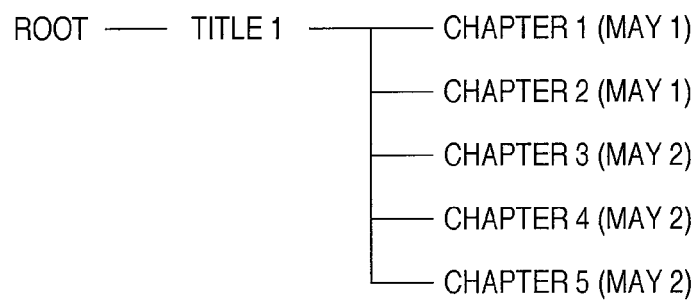
FIG. 5B is a view showing an example of the logical configuration of captured scenes according to the first embodiment of the present invention.

FIG. 5B shows an example of the logical configuration of captured scenes created based on the extracted information. In FIG. 5B, five captured scenes are created as chapters 1 to 5 under one title. The video recording date of chapters 1 and 2 is May 1. The video recording date of chapters 3 to 5 is May 2.

The description will revert to FIG. 3.

Figure 5C:
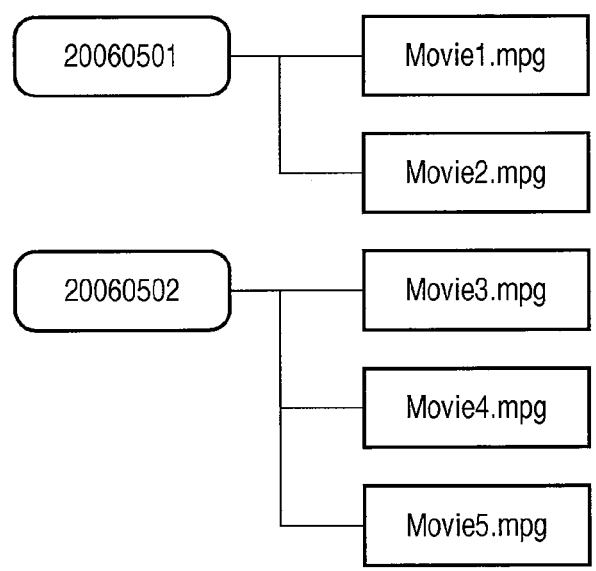
FIG. 5C is a view showing an example of contents information of the directory and file configurations according to the first embodiment of the present invention.

The camera adapter 201 creates hierarchical contents information (first contents information) having directory and file configurations shown in FIG. 5C using the video recording dates as separator information (step S108). That is, the camera adapter 201 has the function of the first creation unit that creates first contents information indicating a list of video files.

More specifically, the camera adapter 201 creates "20060501" and "20060502" folders corresponding to the respective video recording dates. Also, the camera adapter 201 creates Movie1.mpg and Movie2.mpg files under the "20060501" folder, and Movie3.mpg to Movie5.mpg files under the "20060502" folder.

As shown in this example, if even a chapter included in an identical title has a different video recording date, a file of that chapter is stored in another folder. This is because the camera adapter 201 is set to classify captured scenes to have the video recording dates as separator information.

A case will be explained below wherein the DVD video camera 202 is temporarily disconnected from the camera adapter 201, and operations for unfinalizing the DVD disk for additional video recording, and then finalizing the disk are repeated twice.

Figure 6A:
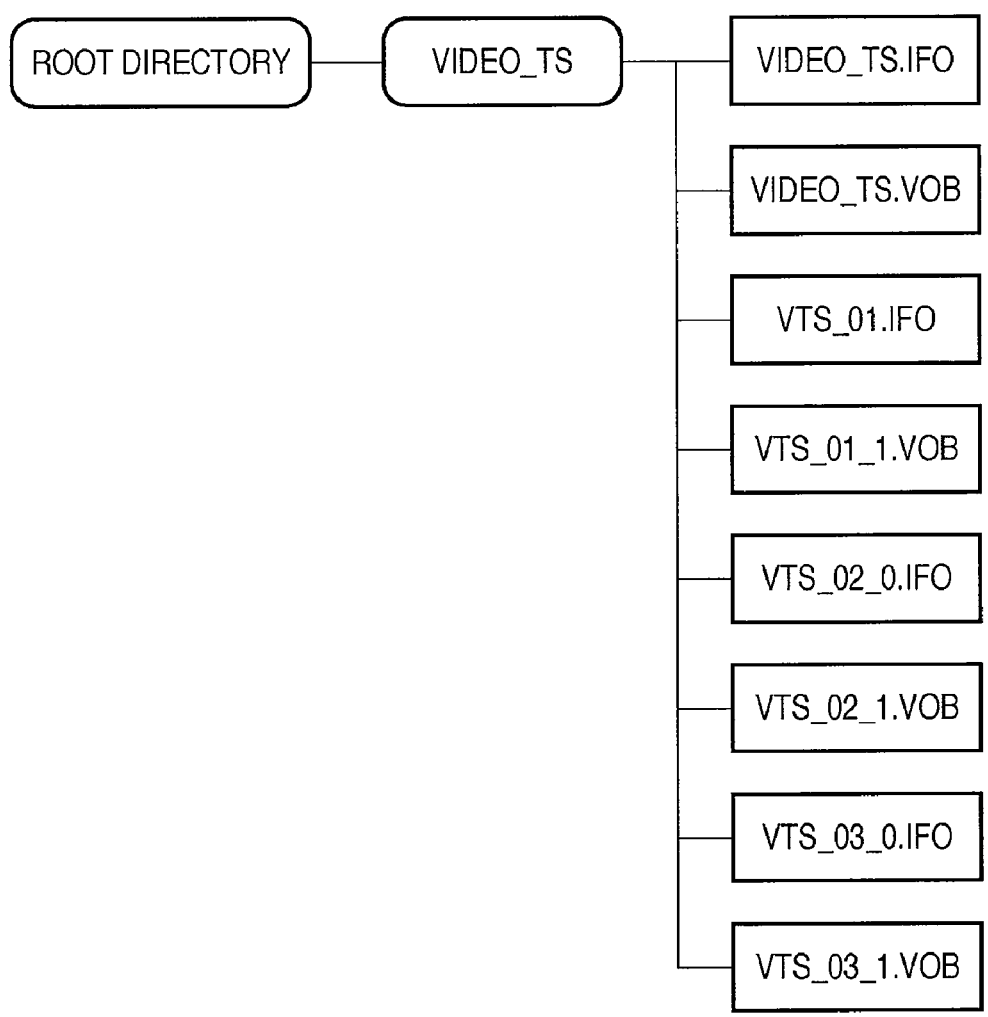
FIG. 6A is a view showing an example of contents information of the directory and file configurations according to the first embodiment of the present invention.

FIG. 6A shows an example of the file configuration on the DVD disk in this case. Every time a newly captured scene is finalized by the DVD video camera 202, files are created as a new video title. Compared to FIG. 5A, two files "VTS_02_1.VOB" and "VTS_03_1.VOB" with the extension "VOB" are added. These files respectively store video data of titles 2 and 3. Also, files "VTS_02_0.IFO" and "VTS_03_0.IFO" with the extension "IFO" are added. These files respectively store related information of titles 2 and 3.

Figure 6B:
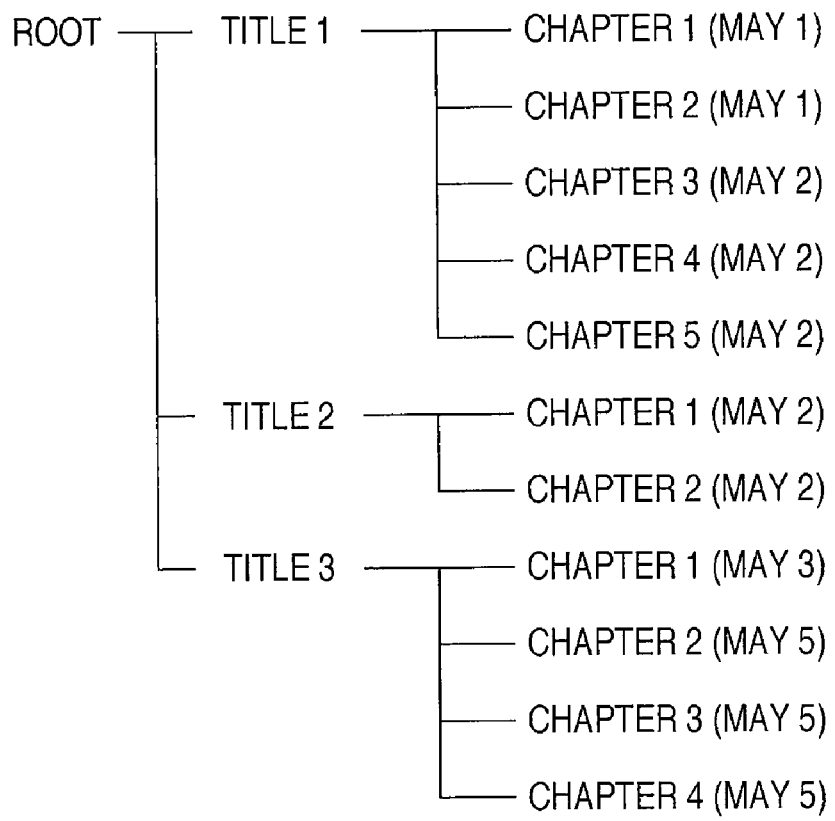
FIG. 6B is a view showing an example of the logical configuration of captured scenes according to the first embodiment of the present invention.

FIG. 6B shows an interpretation example of these files according to the DVD-Video format.

On a root, three titles 1 to 3 exist. In title 1, chapters 1 to 5 are stored. In title 2, chapters 1 and 2 are stored. In title 3, chapters 1 to 4 are stored.

Figure 6C:
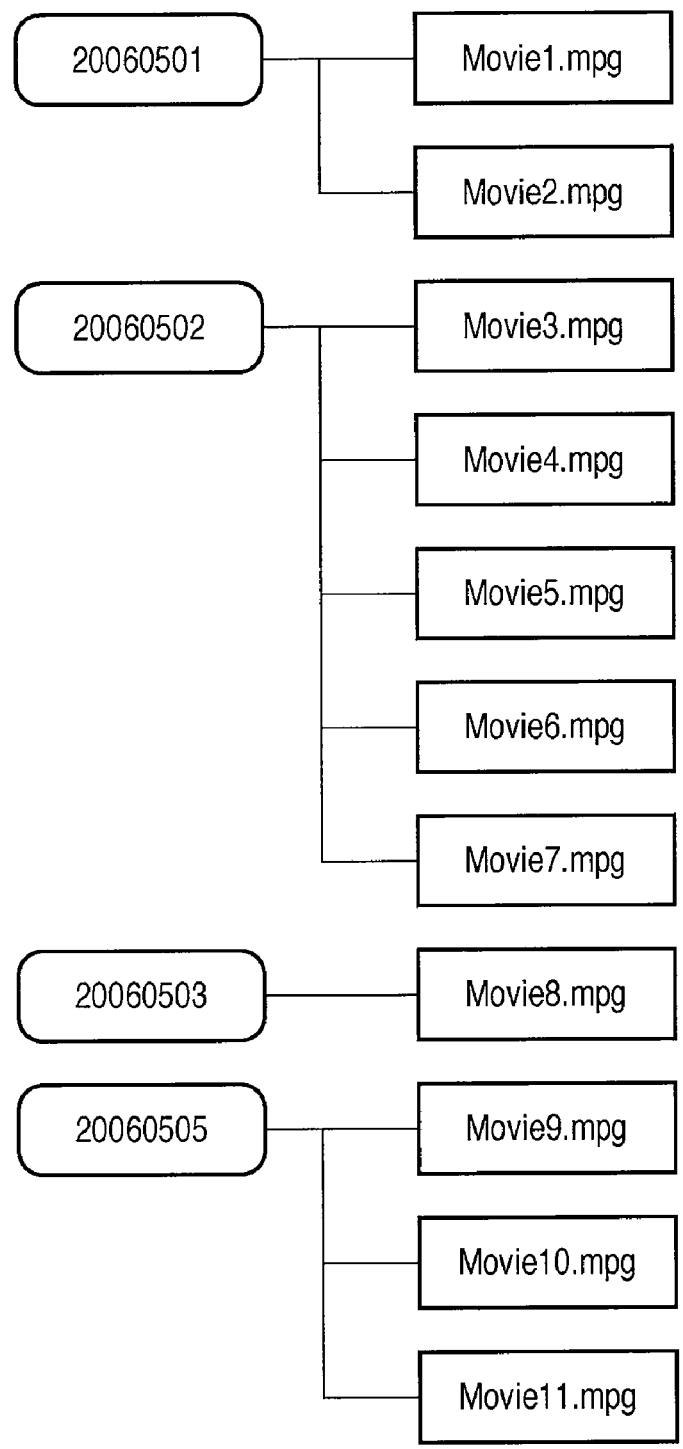
FIG. 6C is a view showing an example of contents information of the directory and file configurations according to the first embodiment of the present invention.

FIG. 6C shows the directory and file configurations when these chapters are classified to have the video recording dates as separator information in the camera adapter 201. Upon comparison with FIG. 5C, "20060503" and "20060505" folders for new video recording dates are created. A captured scene of chapter 1 of title 3 is created as a Movie8.mpg file under the folder "20060503". Captured scenes of chapters 2 to 4 of title 3 are created as Movie9.mpg to Movie11.mpg files under the folder "20060505". Also, under the existing folder "20060502", captured scenes of chapters 1 and 2 of title 2 are respectively added as Movie6.mpg and Movie7.mpg files.

In this example, as can be seen from the "20060502" folder, even chapters included in different titles are stored in an identical folder if they have an identical video recording date. This is because the camera adapter 201 is set to classify captured scenes to have the video recording dates as separator information.

The description will revert to FIG. 3 again.

After step S106 or S108, the camera adapter 201 creates actual directories on the hard disk 109 in accordance with the created contents information. Furthermore, the camera adapter 201 creates MPEG2 files (contents files) corresponding to respective captured scenes in accordance with the contents information (step S109). That is, the camera adapter 201 has a function of a video file creation unit which creates video files in a network advertisement format based on the first contents information and video files acquired from the DVD video camera 202.

The following description will be given taking as an example a case in which the file format is the DVD-VR format, and contents information is that shown in FIG. 4B. As shown in FIG. 4C, two directories (folders) are created, and Movie1.mpg to Movie3.mpg files are stored under a "20060501" folder. Also, Movie4.mpg and Movie5.mpg files are stored under a "20060502" folder.

Upon completion of creation of the directories and contents files on the hard disk 109, the camera adapter 201 creates contents information in the network advertisement format (XML format) (second contents information) (step S110). That is, the camera adapter 201 has a function of a second creation unit which creates second contents information in the network advertisement format based on the first contents information indicating the list of video files.

The camera adapter 201 advertises the created contents information onto the network (step S111)

In response to a contents transfer request received from the television adapter 204 or 206, the camera adapter 201 distributes the created contents to the television adapter 204 or 206 on the network (step S112).

The communication sequence between the television adapter 204 or 206 and the camera adapter 201 upon advertising the contents information onto the network will be described below with reference to FIG. 7 and FIGS. 8A to 8C.

Figure 7:
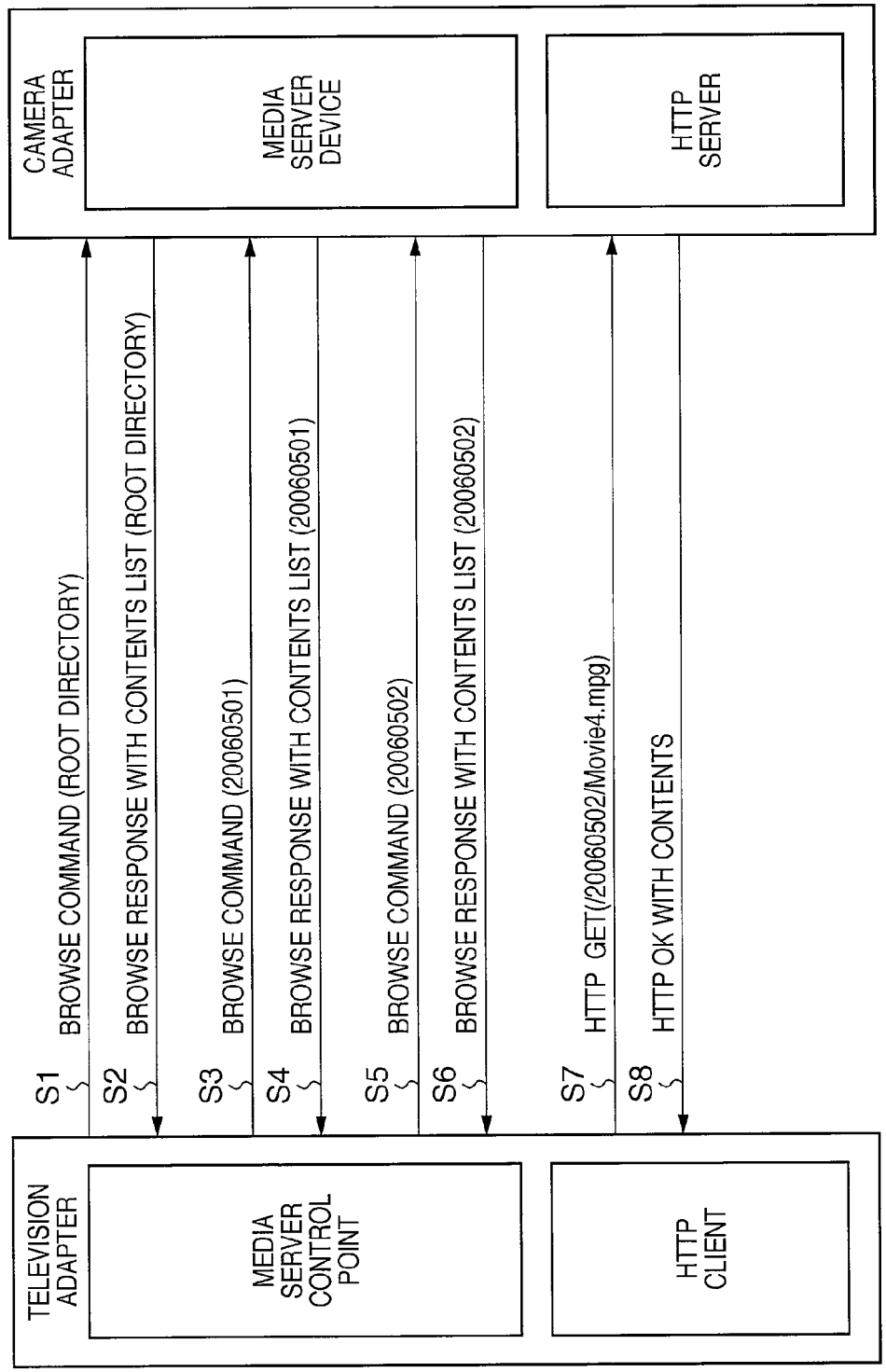
FIG. 7 is a chart showing a communication sequence associated with acquisition of a contents list and contents between a television adapter and the camera adapter according to the first embodiment of the present invention.

FIG. 7 is a chart showing the communication sequence associated with acquisition of a contents list and contents between the television adapter and camera adapter according to the first embodiment of the present invention. FIGS. 8A to 8C show contents information for network advertisement generated by the camera adapter according to the first embodiment of the present invention.

The following description will be given taking as an example a case in which a communication is made between the television adapter 204 and camera adapter 201. The television adapter 204 serves as a media server control point and HTTP client, which acquire contents information (media data). On the other hand, the camera adapter 201 serves as a media server device and HTTP server, which provide contents information (media data).

The television adapter 204 sends a Browse command of a ContentDirectory service to the camera adapter 201 according to the DLNA guideline (step S1). Note that this Browse command designates "ObjectID=0" as a parameter used to designate an object to be displayed. Upon reception of the Browse command that designates "ObjectID=0" from the television adapter 204, the camera adapter 201 interprets that the root directory is designated as the object to be displayed. Hence, the camera adapter 201 generates a Browse response including a contents list of the root directory shown in FIG. 8A, and sends it to the television adapter 204 (step S2).

Referring to </container> tags in FIG. 8A, the "20060501" and "20060502" folders exist under the root directory. Display titles of these folders are "May 1, 2006" and "May 2, 2006", respectively.

Figure 9A:
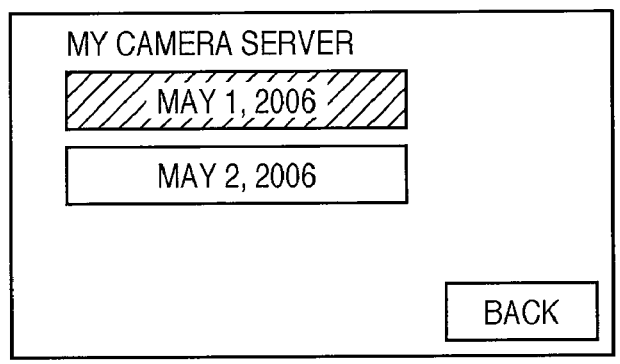
FIG. 9A is a view showing an example of a display screen displayed when the television adapter displays, on a television, contents information received from the camera adapter according to the first embodiment of the present invention.

The television adapter 204 displays the display titles of the folders of the contents list in the received Browse response on the television 208. FIG. 9A shows an example of a display screen. The user selects the "May 1, 2006" folder by operating the remote controller 205 of the television adapter 204. In response to this selection, the television adapter 204 sends a Browse command that designates "ObjectID=/20060501" to the camera adapter 201 (step S3)

Upon reception of the Browse command that designates "ObjectID=/20060501" from the television adapter 204, the camera adapter 201 interprets that the object to be displayed is the "20060501" folder. Then, the camera adapter 201 generates a Browse response including a contents list of the "20060501" folder shown in FIG. 8B, and sends it to the television adapter 204 (step S4).

As can be seen by referring to </item> tags in FIG. 8B, three files, for example, Movie1.mpg to Movie3.mpg files exist, and their display names are "Movie1" to "Movie3", respectively.

Figure 9B:
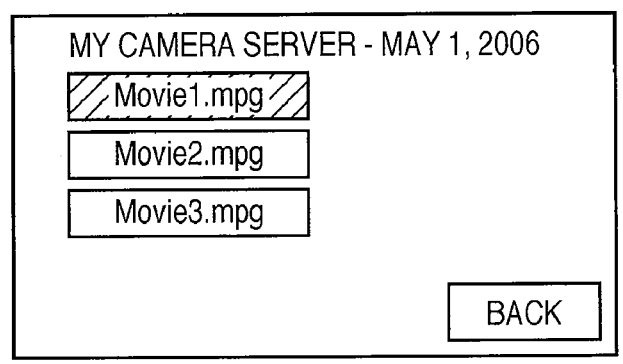
FIG. 9B is a view showing an example of a display screen displayed when the television adapter displays, on the television, contents information received from the camera adapter according to the first embodiment of the present invention.

Furthermore, as can be seen by referring to </res–> tags, these files are video files of the MPEG2-PS format, and can be acquired by an HTTP GET command. The television adapter 204 displays the contents list in the received Browse response on the television 208. FIG. 9B shows an example of a display screen.

On the other hand, in the display state of FIG. 9A, the user selects the "May 2, 2006" folder by operating the remote controller 205 of the television adapter 204. In response to this selection, the television adapter 204 sends a Browse command that designates "ObjectID=/20060502" to the camera adapter 201 (step S5).

Upon reception of the Browse command that designates "ObjectID=/20060502" from the television adapter 204, the camera adapter 201 interprets that the object to be displayed is the "20060502" folder. Then, the camera adapter 201 generates a Browse response including a contents list of the "20060502" folder shown in FIG. 8C, and sends it to the television adapter 204 (step S6).

As can be seen by referring to </item> tags in FIG. 8C, two files, for example, Movie4.mpg and Movie5.mpg files exist, and their display names are "Movie4" and "Movie5", respectively.

Figure 9C:
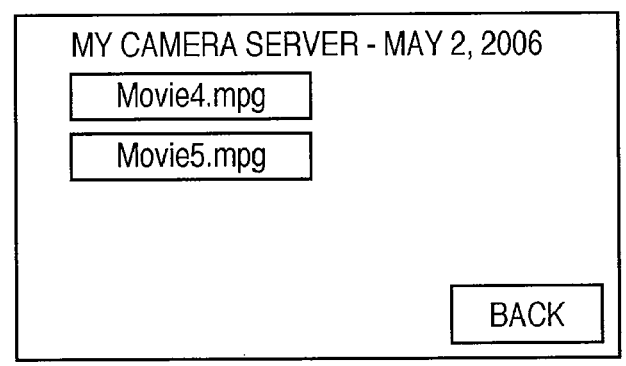
FIG. 9C is a view showing an example of a display screen displayed when the television adapter displays, on the television, contents information received from the camera adapter according to the first embodiment of the present invention.

Furthermore, as can be seen by referring to </res–> tags, these files are video files of the MPEG2-PS format, and can be acquired by an HTTP GET command. The television adapter 204 displays the contents list in the received Browse response on the television 208. FIG. 9C shows an example of a display screen.

The user selects to play back the Movie4.mpg file in the "May 2, 2006" folder by operating the remote controller 205 of the television adapter 204. In response to this selection, the television adapter 204 sends an HTTP GET request having a parameter "/20060502/Movie4.mpg" to the camera adapter 201 (step S7).

The camera adapter 201 sends the Movie4.mpg file under the directory "20060502" to the television adapter 204 using an HTTP OK response (step S8).

Upon reception of this response, the television adapter 204 plays back and displays the received file on the television 208.

As described above, according to the first embodiment, video files on the DVD disk in the DVD video camera are mapped on hierarchical contents information of the file system format that can be accessible by a computer. Based on the contents information, contents information in the network advertisement format which is accessible from the client terminal on the network is created.

In this way, the client terminal connected to the camera adapter via the network can access contents information on the camera adapter.

Second Embodiment

In the first embodiment, the separator information set in the camera adapter 201 uses video recording dates. However, the present invention is not limited to this. The second embodiment will explain an arrangement in which power ON/OFF timing information of the camera that can be acquired from the DVD video camera 202 is used as separator information.

In the first embodiment, the separator information used by the camera adapter 201 is set in advance in the camera adapter 201. However, the client terminal (e.g., the television adapter 204 or 206) may be allowed to set the separator information. For example, the user may set separator information from options of separator information held by the camera adapter 201 via the network by operating the television adapter 204 using the remote controller 205.

In the second embodiment, assume that the DVD video camera 202 used has a function of creating separator information to be used later, and storing the created separator information in a separator information file as a file for storing the separator information. By reading this separator information file, the camera adapter 201 can acquire the separator information from the DVD video camera 202. The camera adapter 201 advertises the acquired separator information options onto the network, and sets the selected separator information in response to a selection instruction from the client terminal.

The communication sequence between the television adapter 204 or 206 and camera adapter 201 according to the second embodiment will be described below with reference to FIG. 10 and FIGS. 11A and 11B.

FIG. 10 is a chart showing the communication sequence associated with acquisition of separator information, a contents list, and contents between the television adapter and camera adapter according to the second embodiment of the present invention. FIGS. 11A and 11B show display examples of separator information setting screens of the client terminal according to the second embodiment of the present invention.

The following description will be given taking as an example a communication between the television adapter 204 and camera adapter 201.

Figure 11A:
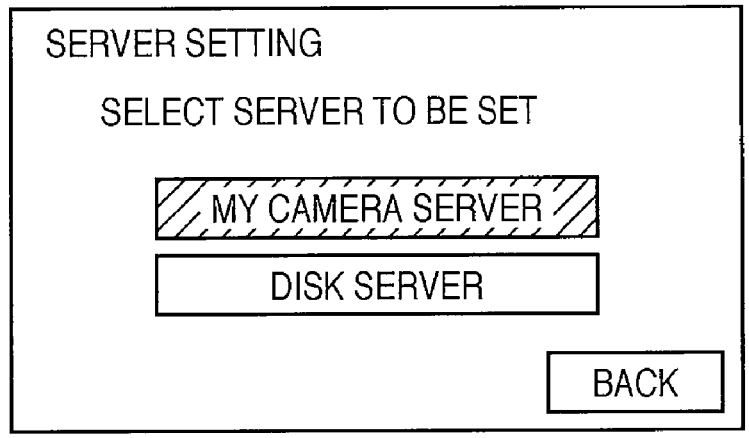
FIG. 11A is a view showing a display example of a separator information setting screen of the client terminal according to the second embodiment of the present invention.
Figure 11B:
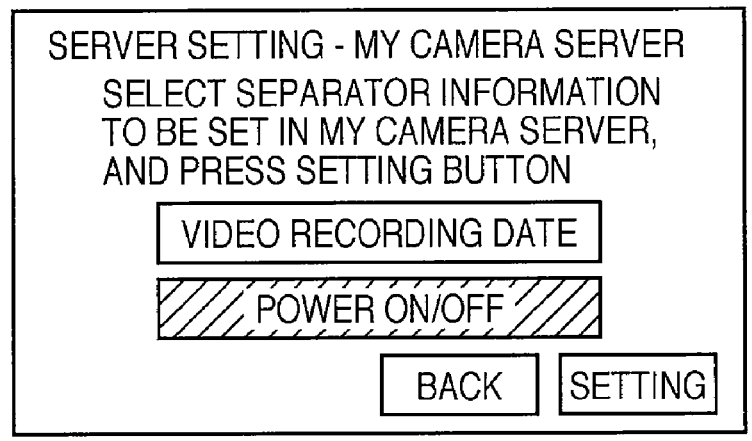
FIG. 11B is a view showing a display example of a separator information setting screen of the client terminal according to the second embodiment of the present invention.

The television adapter 204 displays a server setting screen shown in FIG. 11A on the television 208. This server setting screen includes "My camera server" and "disk server" as servers. Note that "My camera server" corresponds to the camera adapter 201, and "disk server" corresponds to a storage server (not shown) on the network.

The user selects "My camera server" as the camera adapter 201 by operating the remote controller 205. In response to this selection, the television adapter 204 sends a separator information acquisition command to the camera adapter 201 (step S11). This command is sent using the scheme of a SOAP (Simple Object Access Protocol) message.

The camera adapter 201 sends a separator information acquisition response including options of separator information to the television adapter 204 (step S12).

The television adapter 204 displays a separator information selection screen (FIG. 11B) including options in the received separator information acquisition response on the television 208. When the user selects "power ON/OFF" as separator information by operating the remote controller 205 and presses a setting button, the television adapter 204 sends a separator information setting command to the camera adapter 201 (step S13). This command is sent using the scheme of a SOAP (Simple Object Access Protocol) message.

Upon reception of this command, the camera adapter 201 sends a separator information setting response indicating "setting OK" to the television adapter 204 (step S14). In this way, the separator information setting sequence is complete. After that, the user can receive contents information classified based on the set separator information from the camera adapter 201 and can display the received information on the television 208 by operating the remote controller 205.

After that, for the displayed contents information, the camera adapter 201 generates a Browse response including a contents list of the root directory, and sends it to the television adapter 204 (step S15).

The television adapter 204 displays display titles of folders in the contents list in the received Browse response on the television 208. The user selects a "Scenario1" folder by operating the remote controller 205 of the television adapter 204. In response to this selection, the television adapter 204 sends a Browse command that designates "ObjectID=/Scenario1" to the camera adapter 201 (step S17).

Upon reception of the Browse command that designates "ObjectID=/Scenario1" from the television adapter 204, the camera adapter 201 interprets that the object to be displayed is the "Scenario1" folder. Then, the camera adapter 201 generates a Browse response including a contents list of the "Scenario1" folder, and sends it to the television adapter 204 (step S18).

The processing of the camera adapter 201 when separator information is set from the client terminal will be described below with reference to FIG. 12.

FIG. 12 is a flowchart showing the processing of the camera adapter according to the second embodiment of the present invention.

Note that a case will be exemplified below wherein the format of the DVD video camera is recognized as the DVD-Video format. This processing is implemented when the system controller 100 of the camera adapter 201 controls various components in the camera adapter 201. Also, assume that the client terminal is the television adapter 204.

The camera adapter 201 sets "video recording date" as a default option of separator information, that is, it sets an initial setting of separator information used in itself as "video recording date" (step S201). This initial setting is used when there is no setting instruction from the client terminal.

The camera adapter 201 checks if files acquired from the DVD video camera 202 includes a separator information file (step S202). Assume that the separator information file has a name "SEPARATE.EXT".

If no separator information file is included (NO in step S202), the process jumps to step S204. On the other hand, if the separator information file is included (YES in step S202), the camera adapter 201 acquires the separator information file from the acquired files, and adds it to an option (step S203).

FIG. 13 shows an example of the separator information file created by the DVD video camera 202. A line bounded by a <SeparatorList> start tag and its end tag describes each individual separator information using a <Separator> tag. This example indicates that power ON/OFF information is available as the separator information generated by the DVD video camera 202. In this case, the camera adapter 201 adds power ON/OFF information as an option of separator information.

The description will revert to FIG. 12.

The camera adapter 201 advertises the options of separator information onto the network (step S204). In this case, since the camera adapter 201 acquires "power ON/OFF information" from the DVD video camera 202 as separator information, it advertises "video recording date" and "power ON/OFF" as candidates of separator information to be set in itself.

The camera adapter 201 checks if a separator information setting request is received from the client terminal (step S205). If no separator information setting request is received (NO in step S205), the process jumps to step S207. On the other hand, if the separator information setting request is received (YES in step S205), the camera adapter 201 sets the designated separator information in itself (step S206). In this case, if the client terminal designates "power ON/OFF information" as separator information, "power ON/OFF information" is set as the separator information used by the camera adapter 201.

The camera adapter 201 checks if a contents information acquisition request is received from the client terminal (step S207). If no contents information acquisition request is received (NO in step S207), the process returns to step S205. On the other hand, if the contents information acquisition request is received (YES in step S207), the process advances to step S208. The camera adapter 201 extracts title information, chapter information, and separator information (power ON/OFF information) from files, and creates a folder configuration by classifying them using "power ON/OFF information" (step S208).

In the example of the separator information file shown in FIG. 13, a line starting with "#" is a comment line. An <event> tag starting with the fifth line describes each individual event. An "information" attribute of the <event> tag indicates an event type, an "attrib" attribute indicates event detailed information, a "date" attribute indicates a date of generation of an event, and a "time" attribute indicates an event generation time.

For example, an event in the fifth line indicates that the power supply of the DVD video camera 202 was turned on just at 13:00:00 on May 3, 2006. An event in the sixth line indicates that video recording was started just at 13:05:00, and an event in the seventh line indicates that video recording was stopped at 13:05:20. The following events indicate that the video recording was repeated twice, and the power supply video camera was turned off at 13:13:50. By interpreting events described in FIG. 13, the timing relationship between the power ON/OFF operations and video recording operations is revealed.

FIG. 14A shows an example of information extracted by the camera adapter 201 from video files with the extension "VRO", related information files with the extension "IFO", and separator information files with the extension "EXT". Individual captured scenes are expressed as chapters, each of which are associated with video recording date information and power ON/OFF information. Chapters 1, 4, and 6 were captured as the first scenes after power-ON. After chapters 3, 5, and 10 were captured, the power supply was turned off.

Figure 14B:
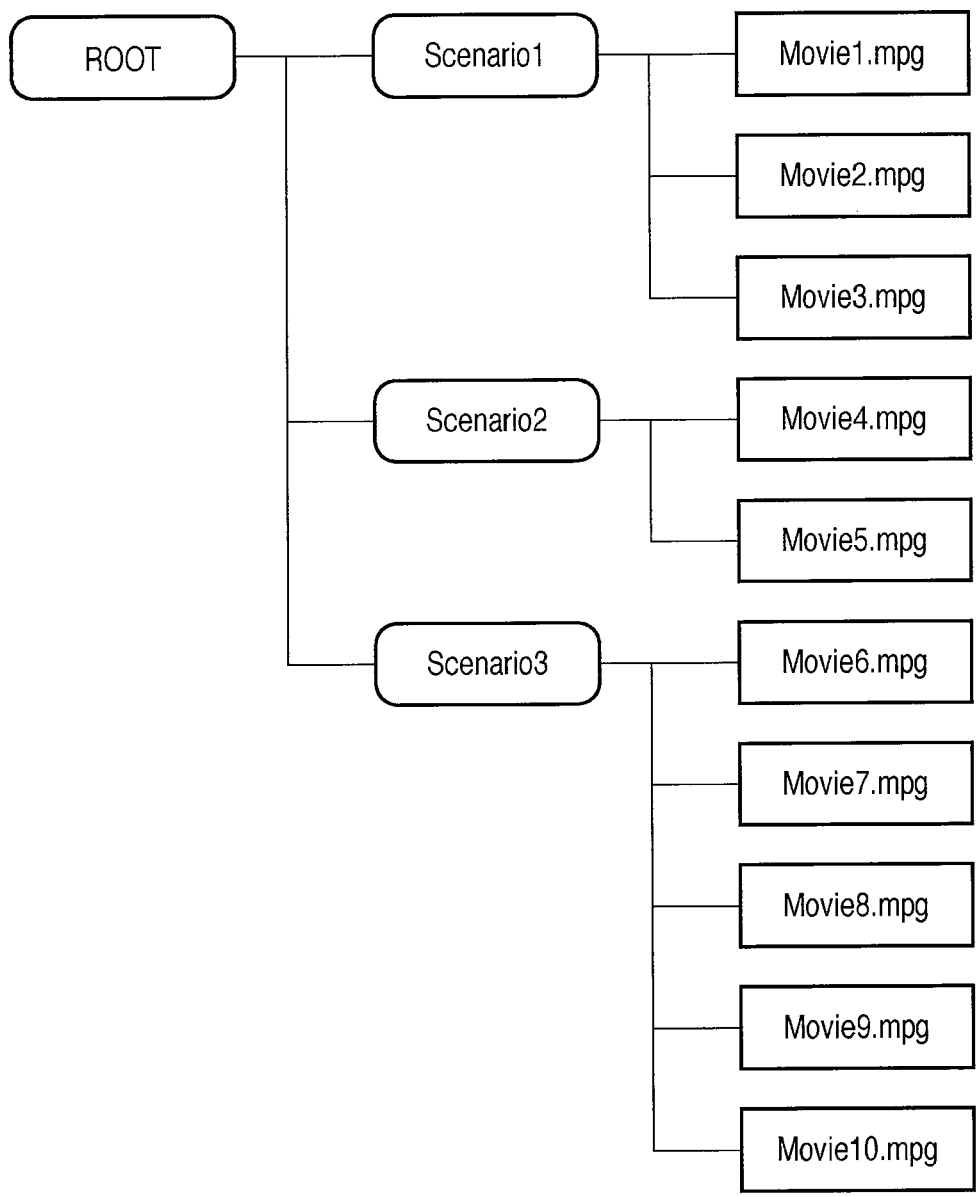
FIG. 14B is a view showing an example of contents information of the directory and file configurations according to the second embodiment of the present invention.

FIG. 14B shows an creation example of the hierarchical structure (directory and file configurations) upon classifying video files using "power ON/OFF information" as the separator information. Three "Scenario1" to "Scenario3" folders are created in correspondence with three power ON/OFF operations, and MPEG2 files corresponding to individual captured scenes are created under these "Scenario" folders.

The description will revert to FIG. 12.

The camera adapter 201 creates contents information in the network advertisement format based on the created folder configuration, and advertises it onto the network (step S210).

Display screen examples of the television adapter upon setting "power ON/OFF information" in the camera adapter 201 as separator information will be described below with reference to FIGS. 15A to 15D. The first screen shown in FIG. 15A displays three items "Scenario1" to "Scenario3" to have a single sequence between the power ON and OFF operations as one scenario.

Figure 15A:
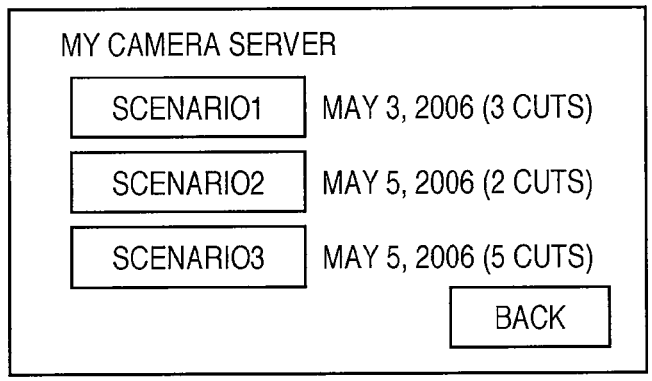
FIG. 15A is a view showing an example of a display screen displayed when the television adapter displays, on the television, contents information received from the camera adapter according to the second embodiment of the present invention.
Figure 15B:
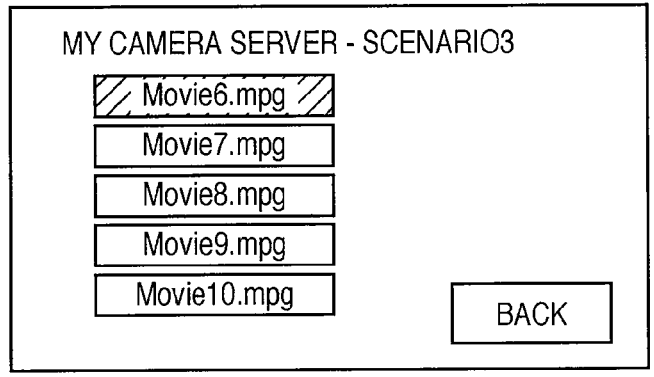
FIG. 15B is a view showing an example of a display screen displayed when the television adapter displays, on the television, contents information received from the camera adapter according to the second embodiment of the present invention.

When the user selects "Scenario3" by operating the remote controller 205, five captured scenes successively captured between the last power ON and OFF operations are displayed as MPEG2 files, as shown in FIG. 15B. When the user selects to play back "Movie6.mpg", the first captured scene since the last power ON operation begins to be played back. Alternatively, when the user selects to play back "Scenario3" on the screen of FIG. 15A, five successively captured scenes can be continuously played back.

Figure 15C:
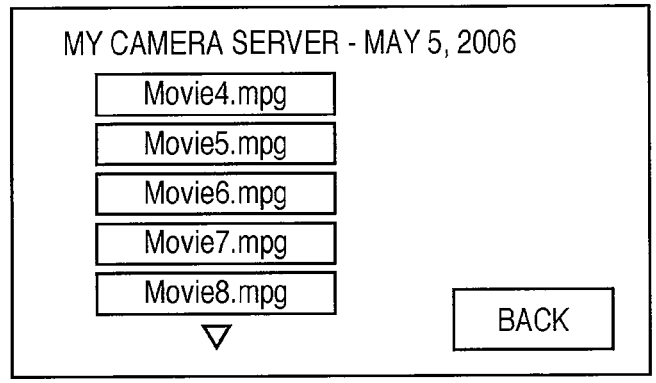
FIG. 15C is a view showing an example of a display screen displayed when the television adapter displays, on the television, contents information received from the camera adapter according to the second embodiment of the present invention.
Figure 15D:
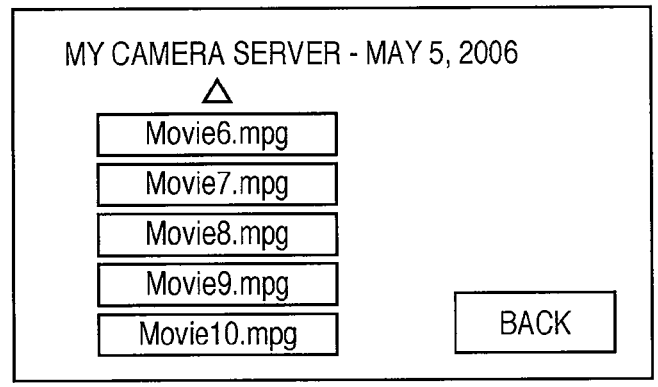
FIG. 15D is a view showing an example of a display screen displayed when the television adapter displays, on the television, contents information received from the camera adapter according to the second embodiment of the present invention.

For the sake of comparison, FIGS. 15C and 15D show display screen examples when the same captured contents are simply classified based on the video recording dates. A down-pointing triangle in FIG. 15C and an up-pointing triangle in FIG. 15D are operation buttons each of which is selected to scroll the display contents when all items cannot be displayed within the screen. Classification using power ON/OFF information allows the screen to be easier to see and to improve its operability compared to simple classification using the video recording dates.

As described above, according to the second embodiment, since the separator information can be set according to the use applications and purposes in addition to the effects described in the first embodiment, the contents information classified using the classification method that the user more intended can be manipulated.

Third Embodiment

In the above embodiment, separator information created by the DVD video camera 202 is stored in a unique file with the extension "EXT". However, separator information may be stored by other methods. For example, separator information may be stored in an SD memory card as a recording medium which is used to store still image captured data and is connected to the DVD video camera 202. Alternatively, a dedicated data field may be assured in a related information file with the extension "IFO" specified by the DVD standard, and separator information may be stored in that field.

As the separator information to be created by the DVD video camera 202, various other kinds of information may be used in addition to the power ON/OFF information of the DVD video camera 202. For example, the presence/absence and types of title information given to a DVD disk, the video recording mode of the DVD video camera 202 upon video recording, information indicating whether or not a predetermined key of the DVD video camera 202 is pressed, and the like may be used.

Figure 16:
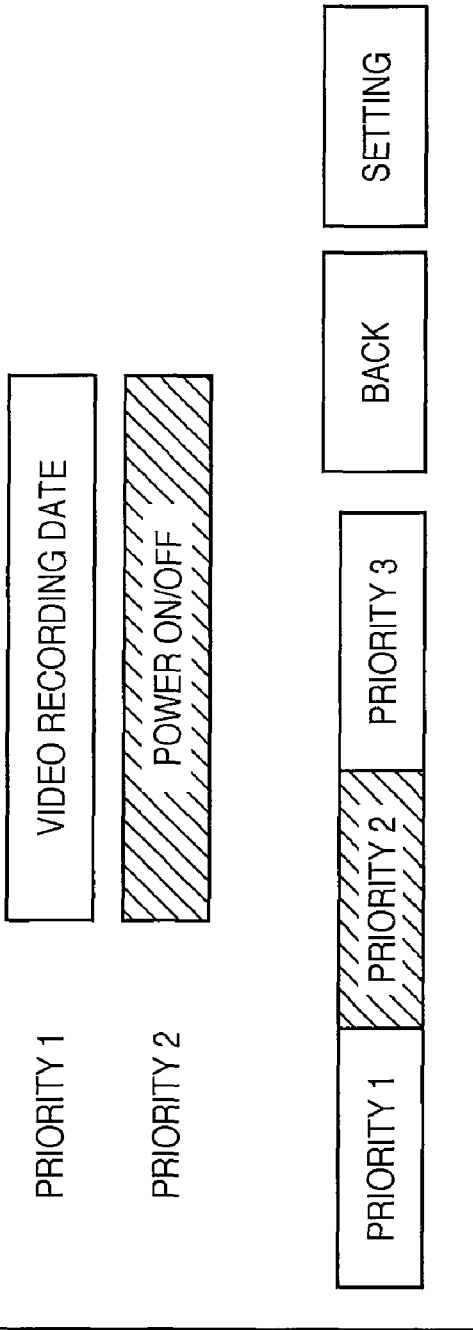
FIG. 16 is a view showing a display example of a separator information setting screen of a client terminal according to the third embodiment of the present invention.

A plurality of pieces of separator information may be combined to attain finer classification. When a plurality of pieces of separator information are used, the priority order may be set for these pieces of separator information to configure a hierarchical structure. FIG. 16 shows a setting screen example used to implement such configuration.

In FIG. 16, "video recording date" is set as first priority separator information, and "power ON/OFF" of the camera is set as second priority separator information. When these pieces of separator information are applied to the example shown in FIG. 14A, contents information can be created to have the directory and file configurations shown in FIG. 17. In FIG. 17, two date folders exist under the root directory.

Figure 18A:
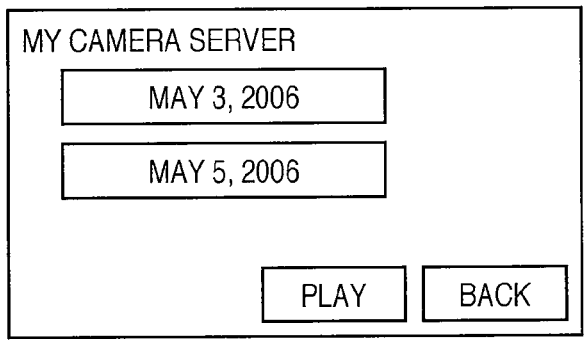
FIG. 18A is a view showing an example of a display screen displayed when the television adapter displays, on the television, contents information received from the camera adapter according to the third embodiment of the present invention.
Figure 18B:
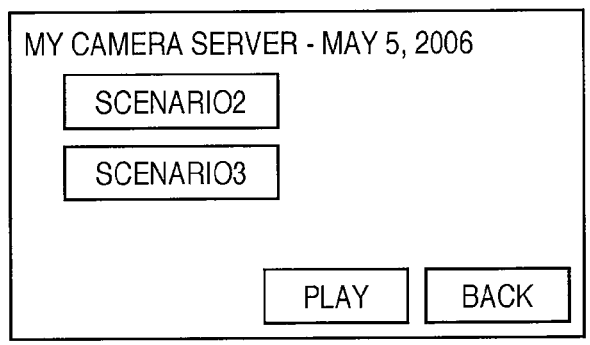
FIG. 18B is a view showing an example of a display screen displayed when the television adapter displays, on the television, contents information received from the camera adapter according to the third embodiment of the present invention.
Figure 18C:
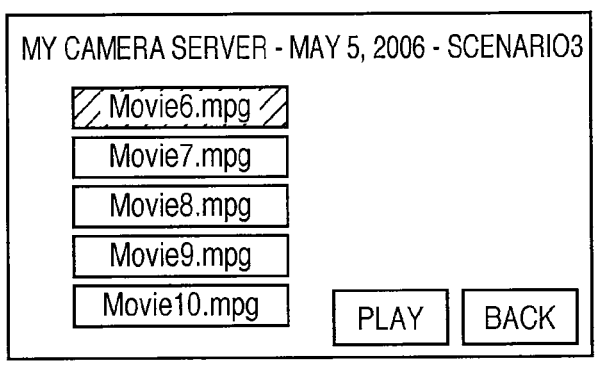
FIG. 18C is a view showing an example of a display screen displayed when the television adapter displays, on the television, contents information received from the camera adapter according to the third embodiment of the present invention.

FIGS. 18A to 18C show display screen examples of the television adapter in this case. In FIG. 18A, "May 3, 2006" and "May 5, 2006" folders are displayed. Upon selection of "May 5, 2006", two sub-folders "Scenario2" and "Scenario3" are further displayed, as shown in FIG. 18B. Upon selection of the "Scenario3" folder in FIG. 18B, five video files "Movie6.mpg" to "Movie10.mpg" are displayed, as shown in FIG. 18C.

As a playback method of video files, for example, when the user selects the "Scenario3" folder and selects to play it back, all files included in the "Scenario3" folder can be played back. On the other hand, when the user selects the "May 5, 2006" folder and selects to play it back, all files included in the "Scenario2" and "Scenario3" folders under the "May 5, 2006" folder can be played back.

A plurality of pieces of separator information may be set to have an identical priority order. For example, assume that video recording is done to have, as separator information, information indicating pressing of a predetermined button of the DVD video camera, and information shown in FIG. 19 can be acquired from the DVD video camera 202. In this example, the user pressed the button on May 4 to start video recording and to capture three scenes. Furthermore, the user captured two scenes on May 5. After that, the user pressed the button again to separate scenarios, and then captured five scenes.

In this case, when the button pressing information and video recording date information are set to have an identical priority order, contents information with the directory and file configurations shown in FIG. 20 can be created. Under the root directory, three folders "20060504-Scenario1", "20060505-Scenario1", and "20060505-Scenario2" exist.

Figure 21A:
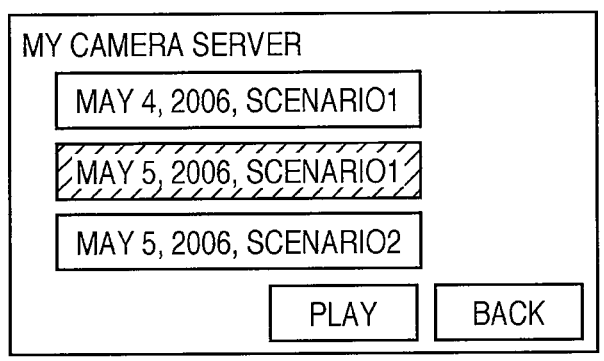
FIG. 21A is a view showing an example of a display screen displayed when the television adapter displays, on the television, contents information received from the camera adapter according to the third embodiment of the present invention.
Figure 21B:
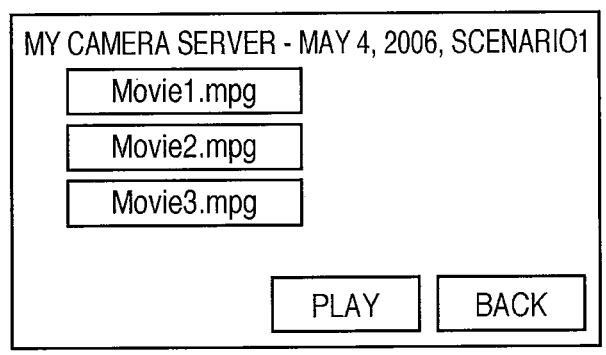
FIG. 21B is a view showing an example of a display screen displayed when the television adapter displays, on the television, contents information received from the camera adapter according to the third embodiment of the present invention.
Figure 21C:
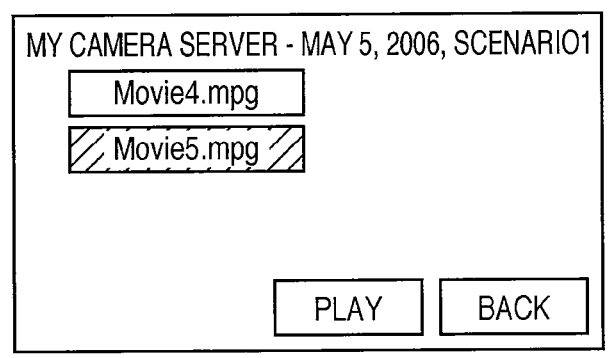
FIG. 21C is a view showing an example of a display screen displayed when the television adapter displays, on the television, contents information received from the camera adapter according to the third embodiment of the present invention.

FIGS. 21A to 21C show display screen examples of the television adapter in this case. In FIG. 21A, items corresponding to three folders are displayed. Upon selection of "May 4, 2006, Scenario1", three contents "Movie1.mpg" to "Movie3.mpg" are displayed, as shown in FIG. 21B. Upon selection of "May 5, 2006, Scenario1", two contents "Movie4.mpg" and "Movie5.mpg" are displayed, as shown in FIG. 21C.

For example, when the user selects the "May 5, 2006, Scenario1" folder and selects to play it back, all two files under the "May 5, 2006, Scenario1" folder can be played back.

As described above, according to the third embodiment, a plurality of types of separator information can be arbitrarily set according to the applications and purposes in addition to the effects described in the first embodiment. Hence, contents information classified based on the classification method that the user more intended can be manipulated.

Fourth Embodiment

In the descriptions of the first to third embodiments, the folder and file configurations classified and created once by the camera adapter 201 based on the set separator information are not changed. However, the present invention is not limited to this. For example, all entities of MPEG2 files are created under a single folder, and links to the entities of the files are created on folders. Hence, by re-creating these links, the logical configuration can be dynamically changed without moving data.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-211930 filed on Aug. 15, 2007, which is hereby incorporated by reference herein in its entirety.

What is claimed is:

1. An adapter apparatus, which connects an image capturing apparatus comprising a disk recording unit for recording video data on a disk recording medium according to a specific format, and delivers video files recorded on the disk recording medium of the image capturing apparatus to a client terminal on a network, the apparatus comprising:
   an acquisition unit configured to acquire video files recorded on the disk recording medium from the image capturing apparatus connected to the adapter apparatus;
   a setting unit configured to set separator information for separating the video files acquired by said acquisition unit;
   a first creation unit configured to create first contents information comprised by a hierarchical directory and file configuration into which the video files are classified based on the separation information set by said setting unit, as a list of the video files acquired by said acquisition unit;
   a second creation unit configured to create second contents information in a network advertisement format based on the first contents information created by said first creation unit;
   a video file creation unit configured to create video files in the network advertisement format based on the first contents information created by said first creation unit and the video files acquired by said acquisition unit;
   an advertisement unit configured to advertise the second contents information created by said second creation unit onto the network; and
   a distribution unit configured to distribute, to the client terminal, video files requested from the client terminal on the network based on the second contents information advertised by said advertisement unit.

2. The apparatus according to claim 1, further comprising:
   a recognition unit configured to recognize a recording format of the video files recorded on the disk recording medium; and
   an interpretation unit configured to interpret the video files acquired from the image capturing apparatus in accordance with the recording format recognized by said recognition unit,
   wherein said first creation unit creates first contents information based on an interpretation result of said interpretation unit and the separation information.

3. The apparatus according to claim 2, wherein the recording format is one of a DVD-Video format and a DVD-VR format.

4. The apparatus according to claim 1, wherein said first creation unit creates the first contents information comprised by a hierarchical directory and file configuration into which a plurality of captured scenes included in the video files acquired by said acquisition unit is classified based on the separator information, as the list.

5. The apparatus according to claim 1, wherein said first creation unit creates the first contents information comprised by a hierarchical directory and file configuration into which a plurality of captured scenes included in a plurality of video files acquired by said acquisition unit is classified based on the separator information, as the list.

6. The apparatus according to claim 1, further comprising:
   a storage unit configured to store a plurality of types of the separator information; and
   a selection unit configured to select the separator information used by said first creation unit from the plurality of types of separator information.

7. A method of controlling an adapter apparatus, which connects an image capturing apparatus comprising a disk recording unit for recording video data on a disk recording medium according to a specific format, and delivers video files recorded on the disk recording medium of the image capturing apparatus to a client terminal on a network, the method comprising:
   by an acquisition unit of the adapter apparatus, an acquisition step of acquiring video files recorded on the disk recording medium from the image capturing apparatus connected to the adapter apparatus;
   by a setting unit of the adapter apparatus, a setting step of setting separator information for separating the video files acquired in said acquisition step;
   by a first creation unit of the adapter apparatus, a first creation step of creating first contents information comprised by a hierarchical directory and file configuration into which the video files are classified based on the separation information set in the setting step, as a list of video files acquired in said acquisition step;
   by a second creation unit of the adapter apparatus, a second creation step of creating second contents information in a network advertisement format based on the first contents information created in the first creation step;
   by a video file creation unit of the adapter apparatus, a video file creation step of creating video files in the network advertisement format based on the first contents information created in the first creation step and the video files acquired in the acquisition step;
   by an advertisement unit of the adapter apparatus, an advertisement step of advertising the second contents information created in the second creation step onto the network; and
   by a distribution unit of the adapter apparatus, a distribution step of distributing, to the client terminal, video files requested from the client terminal on the network based on the second contents information advertised in the advertisement step.

8. A computer program stored in a computer storage medium to make a computer execute control of an adapter apparatus, which connects an image capturing apparatus comprising a disk recording unit for recording video data on a disk recording medium according to a specific format, and delivers video files recorded on the disk recording medium of the image capturing apparatus to a client terminal on a network, the program making the computer execute:

an acquisition step of acquiring video files recorded on the disk recording medium from the image capturing apparatus connected to the adapter apparatus;

a setting step of setting separator information for separating the video files acquired in said acquisition step;

a first creation step of creating first contents information comprised by a hierarchical directory and file configuration into which the video files are classified based on the separation information set in the setting step, as a list of video files acquired in said acquisition step;

a second creation step of creating second contents information in a network advertisement format based on the first contents information created in the first creation step;

a video file creation step of creating video files in the network advertisement format based on the first contents information created in the first creation step and the video files acquired in the acquisition step;

an advertisement step of advertising the second contents information created in the second creation step onto the network; and a distribution step of distributing, to the client terminal, video files requested from the client terminal on the network based on the second contents information advertised in the advertisement step.

* * * * *